(12) United States Patent
Uhrenholt

(10) Patent No.: US 11,908,069 B2
(45) Date of Patent: Feb. 20, 2024

(54) GRAPHICS PROCESSING

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/558,383

(22) Filed: Dec. 21, 2021

(65) Prior Publication Data

US 2023/0196661 A1 Jun. 22, 2023

(51) Int. Cl.
*G06T 15/40* (2011.01)
*G06T 15/30* (2011.01)

(52) U.S. Cl.
CPC .............. *G06T 15/40* (2013.01); *G06T 15/30* (2013.01)

(58) Field of Classification Search
None
See application file for complete search history.

(56) References Cited

U.S. PATENT DOCUMENTS 6,507,348 B1 * 1/2003 Mang ..................... G06T 15/30
345/622

* cited by examiner

*Primary Examiner* — Nurun Flora
(74) *Attorney, Agent, or Firm* — Vierra Magen Marcus LLP

(57) ABSTRACT

When generating a render output in which primitives to be rendered are to be clipped against a user-defined clip plane defined for the render output, and a primitive to be rendered is intersected by a user-defined clip plane defined for the render output, an edge representing the intersection of the primitive with the user-defined clip plane is determined. The rasteriser, when rasterising the primitive, then tests one or more regions of the render output being generated against the determined edge representing the intersection of the primitive with the user-defined clip plane to determine whether the region or regions should not be rendered for the primitive on the basis of the user-defined clip plane.

20 Claims, 7 Drawing Sheets

GRAPHICS PROCESSING

BACKGROUND

The technology described herein relates to graphics processing, and in particular to the performing of clipping in graphics processing.

Graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates), e.g. for display.

Once primitives and their vertices have been generated and defined, they can be processed, in order, e.g., to display the frame.

This process basically involves determining which sampling points of an array of sampling points covering the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed).

The rendering process then derives the data, such as red, green and blue (RGB) colour values and an "Alpha" (transparency) value, necessary to represent the primitive at the sample points (i.e. "shades" each sample point). This can involve applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

Graphics processing commonly uses so-called "clipping" to avoid rendering geometry where it is not required. There may, for example, be near and far clipping planes defined for a render output (e.g. frame to be displayed), and also clipping planes that are defined around the, e.g. x and y edges, of the render output (e.g. frame), to eliminate geometry that will fall outside the visible view, port, for example.

In general, one or more clipping planes are defined, and if geometry is "outside" one of the clipping planes, then it is not processed.

Typically when performing rendering, a clip space is defined, and the geometry rendered is "clipped" to that clip space. The vertex coordinates for the geometry are then output in "clip space" coordinates, which are typically defined to be in the range +1 to −1 (i.e. such that after clipping all vertex positions will be guaranteed to be in the range −1 to +1). The clip space coordinates are then mapped to the appropriate "screen space" coordinates, e.g. such that −1 in clip space is mapped to 0 in screen space, and +1 in clip space is mapped to the maximum screen space coordinate value in the direction in question. This can then simplify the precision that is required after clipping, as after clipping all coordinates can be treated as being in a particular, e.g. fixed point, format.

When performing clipping, when a vertex for a primitive falls outside the clip space (such that the primitive to which the vertex belongs needs to be "clipped"), normally a new vertex or vertices that are positioned on the appropriate clipping plane defining the edge of the clip space are defined (i.e. such that new vertices and correspondingly new primitives are defined to take account of the effect of the clipping).

FIG. 1 illustrates this and shows an exemplary primitive 1 having a vertex 2 that falls outside the desired clip space 3. As shown in FIG. 1, to clip the primitive 1 to the right hand plane (edge) of the clip space 3, two new vertices 4, 5 lying on that plane (edge) of the clip space 3 are generated, to thereby create two new primitives 6, 7, that fall entirely within the clip space 3 (that will then be rendered instead of the original primitive 1).

This process allows the clipping requirement to be correctly handled, but does require the generation of additional vertices and primitives for the rendering process.

Graphics APIs, such Vulcan, OpenGL and Direct3D, also permit the user (the application programmer) to define one or more "user-defined" clip planes, against which geometry can be clipped (in addition to any clip planes defining the "clip space" boundary). These additional user-defined clip planes are defined by setting a "clip distance" from each vertex to the clip plane in question. Then, if the distance from the vertex to a user-defined clip plane is negative (e.g.), the vertex is considered to be behind the user-defined clip plane and so should be clipped to that user-defined clip plane.

(The clip distance from a vertex to a given user-defined clip plane is usually determined and defined as part of the vertex shading process for the vertex in question: the vertex shading will generate and output as part of the vertex shaded data for a vertex, a clip distance for (to) each user-defined clip plane.)

FIG. 2 illustrates this, and shows an exemplary user-defined clip plane 20 intersecting a primitive 21, such that the region 22 to the left of the user-defined clip plane 20 should be clipped (in this example). (The primitive 21 will also be clipped against the clip space 3 boundaries as appropriate.)

Clipping against a user-defined clip plane, such as the clip plane 20 illustrated in FIG. 2, can be performed in a similar manner to performing clipping against the clip space boundaries, i.e. by generating appropriate new vertices that lie on the clip plane, and correspondingly new primitives including those vertices, for the rendering process.

Where user-defined clip planes can be used, typically a plurality, e.g. up to eight, user-defined clip planes can be defined for any given render output. The Applicants have recognised that this could, accordingly, lead to the need to generate a potentially large number of additional new vertices (and corresponding primitives including those vertices) to handle the user-defined clip planes clipping process. This may be undesirable, particularly in the case of tile-based rendering, since it may require the introduction of a potentially significant number of new vertices which are not present in the application defined vertex buffer for the render output in question.

The Applicants believe therefore that there remains scope for improved methods and apparatus for handling clipping when using user-defined clip planes.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
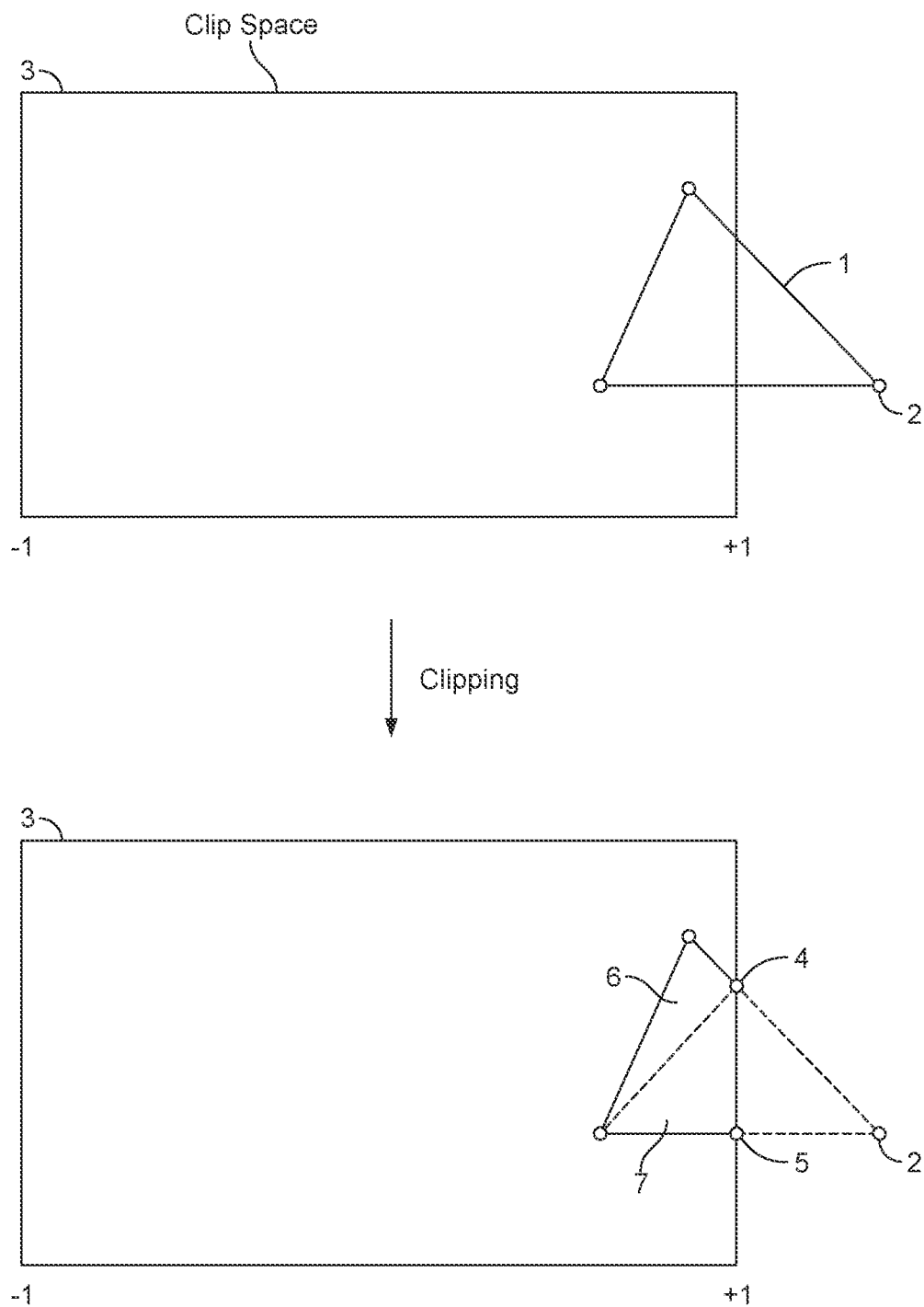
FIG. 1 illustrates the operation of clipping in graphics processing.
Figure 2:
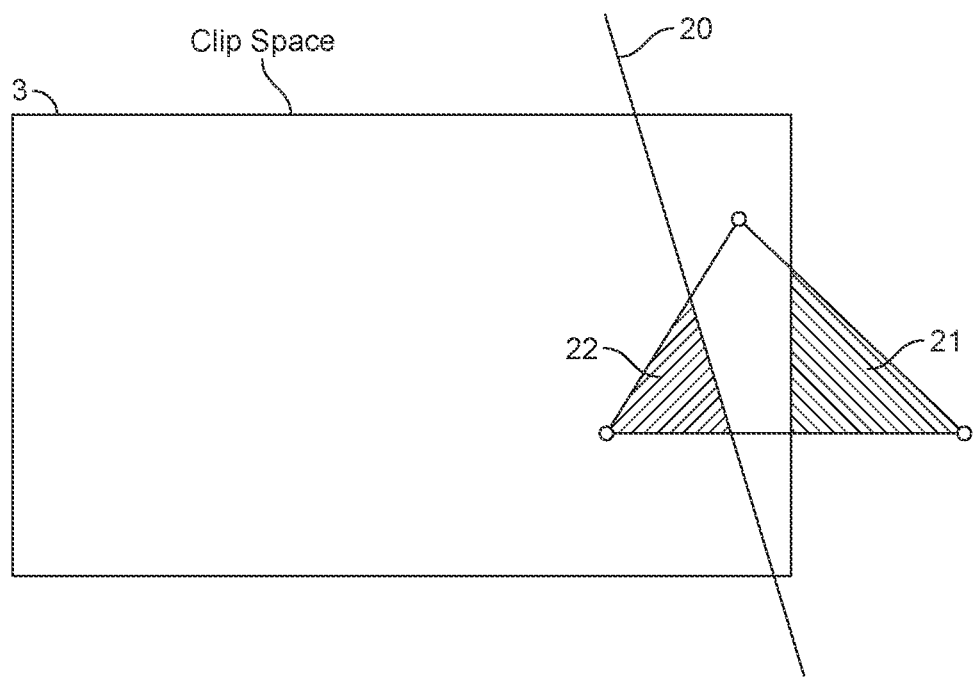
FIG. 2 illustrates the use of user-defined clip planes in graphics processing.

A first embodiment of the technology described herein comprises a method of operating a graphics processor that includes a rasteriser that is operable to test a region of a render output being generated against edges defined for a primitive to be rendered to determine whether the primitive covers any part of the region of the render output, the method comprising:

when generating a render output in which primitives to be rendered are to be clipped against a user-defined clip plane defined for the render output, such that when at least part of a primitive to be rendered falls behind the user-defined clip plane, the at least part of the primitive to be rendered that falls behind the user-defined clip plane should be clipped to the user-defined clip plane;

for a primitive to be rendered for the render output that is intersected by the user-defined clip plane defined for the render output:

determining an edge representing the intersection of the primitive with the user-defined clip plane; and the rasteriser, when rasterising the primitive:

testing one or more regions of the render output being generated against the determined edge representing the intersection of the primitive with the user-defined clip plane to determine whether the region or regions should not be rendered for the primitive on the basis of the user-defined clip plane.

A second embodiment of the technology described herein comprises a graphics processor, the graphics processor comprising:

a rasteriser that is operable to test regions of a render output being generated against edges defined for a primitive to be rendered to determine whether the primitive covers any part of the regions of the render output; and a processing circuit configured to, when the graphics processor is generating a render output in which primitives to be rendered are to be clipped against a user-defined clip plane defined for the render output, such that when at least part of a primitive to be rendered falls behind a user-defined clip plane, the at least part of the primitive to be rendered that falls behind the user-defined clip plane should be clipped to the user-defined clip plane:

determine for a primitive to be rendered for a render output that is intersected by a user-defined clip plane defined for the render output, an edge representing the intersection of the primitive with the user-defined clip plane;

wherein the rasteriser is configured to, when rasterising a primitive for which an edge representing the intersection of the primitive with a user-defined clip plane has been determined:

test one or more regions of a render output being generated against the determined edge representing the intersection of the primitive with a user-defined clip plane to determine whether the region or regions should not be rendered for the primitive on the basis of the user-defined clip plane.

The technology described herein relates to the rendering of primitives when using user-defined clip planes, and in particular to the performing of clipping against user-defined clip planes when rendering primitives. In the technology described herein, (at least) when a user-defined clip plane intersects a primitive to be rendered, rather than generating new vertices (and primitives) to account for clipping against the user-defined clip plane, an edge representing the intersection of the primitive with the user-defined clip plane is determined, and then regions of the render output (e.g. sampling positions) are tested against that user-defined clip plane "edge" during the rasterisation process, to thereby determine whether the regions (e.g. sampling points) should not be rendered (should be other than rendered) for the primitive according to the user-defined clip plane.

In other words, as well as the rasteriser testing regions of the render output against the "normal" edges of a primitive when rasterising a primitive, the rasteriser will also test the regions of the render output against zero or more "user-defined clip plane" edges for the primitive, representing any user-defined clip planes that intersect the primitive (and so against which the primitive needs to be tested for clipping purposes), to thereby perform clipping against the user-defined clip plane(s) for the primitive.

As will be discussed further below, this then avoids the need to generate additional vertices (and primitives containing those vertices) to account for user-defined clip planes, and so the Applicants believe will allow user-defined clip planes to be handled in a more efficient manner in a rasterisation-based graphics processor and graphics processing system.

The Applicants have in particular recognised in this regard that rasterisation-based graphics processors and graphics processing systems will already include the appropriate mechanisms for determining (and defining) the edges of primitives to be rendered, and then correspondingly testing (in the rasteriser) render output regions against such edges to determine whether the regions should be rendered for a primitive or not.

It should accordingly not be a significant extra burden to derive additional edges representing the intersections of primitives with user-defined clip planes, and once such edges have been determined, render output regions can then be tested against them in the rasteriser in the same manner as any "normal" primitive edge would be tested (i.e. the rasteriser can operate in the normal manner and perform its normal edge tests in respect of the "user-defined clip plane" edges). The operation in the manner of the technology described herein should not therefore, and will not therefore, require significant modifications or additions to rasterisation-based graphics processors and graphics processing systems.

The technology described herein relates to the processing of primitives when generating a render output for which a user-defined clip plane (e.g., and in an embodiment, in accordance with the appropriate graphics API, such as Vulcan, OpenGL or Direct3D) against which primitives for the render output being generated should be clipped is defined. There may in this regard be only a single user-defined clip plane defined for the render output being generated, or there may be plural user-defined clip planes for the output being generated (e.g. up to a particular, in an embodiment selected, in an embodiment predetermined, maximum permitted number of user-defined clip planes, such as up to eight user-defined clip planes).

Although the operation of the technology described herein will be described with particular reference to processing in respect of a single user-defined clip plane, it will be appreciated that the operation in the manner of the technology described herein can be, and is in an embodiment, applied to and used in respect of any and all user-defined clip planes that are defined for a render output. Thus, in an embodiment, the operation in the manner of the technology described herein will be performed for each user-defined clip plane that is defined for the render output being generated.

The render output that is being generated and for which one or more user-defined clip planes are defined can be any suitable and desired output that a graphics processor and a graphics processing pipeline may be used to generate. In an embodiment the render output is an image (frame) for display, but it can be any other form of graphics processing output, such as graphics textures in a render-to-texture operation, etc., that a graphics processor and graphics processing pipeline may produce, as desired. It could be an entire, e.g. frame, that is being generated, or only part of a, e.g. frame, such as a respective tile (sub-area) of a e.g. frame being generated in the case of a tile-based graphics processor and processing.

The (and each) user-defined clip plane that is defined for the render output being generated can be defined in any suitable and desired manner. It should be, and is in an embodiment, done in accordance with the process for defining user-defined clip planes of the graphics API in question.

In an embodiment the (and each) user-defined clip plane for a render output that is considered and treated in the manner of the technology described herein is defined by defining for each vertex defined for the render output in question, the distance from that vertex to the user-defined clip plane in question.

Thus, in an embodiment, each vertex that is defined for the render output being generated has a respective user-defined clip plane "clip distance" defined for and associated with it for each user-defined clip plane that is defined for the render output, indicating the distance from the vertex to the user-defined clip plane in question.

(There will be one distance per user-defined clip plane for a vertex, so each vertex may, for example, have associated with it up to eight "clip distances", one for each user-defined clip plane. For example, if there are two user-defined clip planes, each vertex will have two respective user-defined clip plane distances associated with it, one distance for each of the two user-defined clip planes.)

The distance to a given clip plane for each vertex defined for the render output being generated can be generated in any suitable and desired manner. In an embodiment, the user-defined clip plane distances for a (and each) vertex for the render output are determined by and as part of the vertex shader (the vertex shading process) when generating the render output.

Thus the method of the technology described herein in an embodiment comprises (and the graphics processor is in an embodiment configured to (and comprises a processing circuit configured to)) performing a vertex shading operation that operates to transform attributes defined for vertices defined for a render output being generated into a desired form for subsequent graphics processing operations, and, as part of that vertex shading operation, generating for a, and in an embodiment for plural, and in an embodiment for each, vertex defined for the render output, a corresponding distance to a user-defined clip plane, for each user-defined clip plane that has been defined for the render output being generated.

Thus, in an embodiment, the method of the technology described herein comprises, and the graphics processor executes a graphics processing pipeline comprising, a vertex shading stage (process) before the rasteriser that executes vertex shading operations on initial attributes data defined for vertices of a render output being generated, so as to generate a desired set of output vertex attributes for use in subsequent processing stages of the graphics processing pipeline. The "shaded" vertex attributes output by the vertex shading stage (the vertex shader) may, and in an embodiment do, comprise, for example, a set of "vertex shaded" vertex attributes data (e.g. appropriately transformed vertex position data) for a (and each) vertex, for processing by the rest of the graphics processing pipeline.

In the technology described herein, the vertex shading stage (processing) will correspondingly also operate to generate, for a, and in an embodiment for plural, and in an embodiment for each, vertex that is being vertex shaded, a corresponding set of one or more user-defined clip plane distances for the vertex (depending upon how many user-defined clip planes there are for the render output being generated), with each such distance indicating the distance from the vertex to the user-defined clip plane in question.

The generated user-defined clip plane distances for the vertices may be, and are in an embodiment, stored together with the other "vertex shaded" vertex attributes output by the vertex shader for use by subsequent stages of the graphics processing operation (pipeline) in any suitable and desired manner. They are in an embodiment handled and stored in the same way that, and in an embodiment together with, the other (the "normal") "vertex shaded" vertex attributes output by the vertex shader are handled and stored in the graphics processor and graphics processing system in question. Thus they may, for example, and in an embodiment, be stored in an appropriate (e.g. main) memory of or accessible to the graphics processor, for subsequent use.

In the technology described herein, (at least) in the case when a primitive is intersected by a user-defined clip plane defined for the render output, an edge representing the intersection of the primitive with the user-defined clip plane is determined (and then used in the rasterisation process to, in effect, cull any part of the primitive that is behind the user-defined clip plane this will be discussed in more detail below).

The edge representing the intersection of a primitive with a user-defined clip plane can be determined in any appropriate and desired manner. In an embodiment, this is done using the distances to the user-defined clip plane defined for and associated with the vertices of the primitive in question. (As discussed above, for each vertex defined for a primitive, there will be a corresponding distance to the user-defined clip plane in question defined. Those distances can then be used to determine the edge representing the intersection of the primitive with the user-defined clip plane.)

The edge representing the intersection of the primitive with the user-defined clip plane can be determined from the defined distances to the user-defined clip plane for the vertices of a primitive in any suitable and desired manner. In an embodiment, an appropriate set of edge information defining the edge representing the intersection of the primitive with the user-defined clip plane is determined.

The edge information can be any kind of information suitable for representing the position of the edge representing the intersection of the primitive with the user-defined clip plane. It in an embodiment represents the edge representing the intersection of the primitive with the user-defined clip plane in the same form as the edges of the primitive itself are defined for the rasterisation process.

Thus, in an embodiment, the edge information comprises a line equation, defining the edge representing the intersection of the primitive with the user-defined clip plane.

The line equation for the edge is in an embodiment of the form:

$$Ax+By+C=0$$

where x and y are the position variables in the plane of the graphics render output, and A, B and C are constants.

The line equation for an edge representing the intersection of a primitive with a user-defined clip plane is in an embodiment configured such that a position in the render output that is behind the user-defined clip plane (and so should be culled from further processing on the basis of the user-defined clip plane) will return a negative value when tested against the line equation defining the edge in the rasteriser (and correspondingly, such that a position in the render output that is inside the clip plane (and so should be rendered with respect to the clip plane in question) will return a positive value when tested against the line equation representing the edge).

An appropriate line equation representing an edge representing the intersection of a primitive with the user-defined clip plane should be, and is in an embodiment, determined (at least) for each user-defined clip plane to be considered for the render output in question that intersects the primitive in question. Thus a given primitive will in an embodiment have associated with it (at least) as many user-defined clip plane "edges" (and thus line equations) as there are user-defined clip planes for the render output being generated that intersect the primitive.

The edge(s) (the line equation(s)) representing the intersection of a primitive with a user-defined clip plane(s) can be determined and generated by any suitable and desired processing circuit of the graphics processor and part (stage) of the graphics processing operation (of the graphics processing pipeline) that the graphics processor executes. They are in an embodiment determined and generated by an appropriate primitive (triangle) setup stage (circuit) of the graphics processing operation (of the graphics processing pipeline) and graphics processor.

Thus, in an embodiment, the method of the technology described herein comprises, and the graphics processor executes a graphics processing pipeline comprising, and includes, a primitive setup stage (process) (circuit) before the rasteriser that operates to (and that is configured to), inter alia, determine information representing the positions of the edges of primitives to be rendered, e.g., and in an embodiment, from vertex shaded vertex attributes output by the vertex shader. In the technology described herein, this primitive setup stage (processing) (circuit) is in an embodiment also operable to generate the appropriate edges representing the intersections of the primitives with any user-defined clip planes, using, inter alia, the user-defined clip plane clip distances for the vertices of a primitive, e.g., and in an embodiment, determined by the vertex shading stage.

Thus the primitive setup stage (circuit) will in an embodiment receive information representing the distance of each vertex defining a primitive to be rendered to a given user-defined clip plane, and determine therefrom edge information (and in an embodiment a line equation) representing the position of the edge that represents the intersection of the primitive the user-defined clip plane in question. This is in an embodiment done (at least) for each user-defined clip plane that intersects the primitive in question.

The primitive set-up stage (circuit) can be located at any suitable or desired position within the graphics processing pipeline that, e.g. is after the vertex shading stage (and a geometry shading of the graphics processing pipeline, if any). In an embodiment, the primitive set-up stage (circuit) is part of a rasterisation stage (the rasteriser) of the graphics processing pipeline. Alternatively, the primitive set-up stage may be separate to the rasterisation stage (rasteriser), e.g. at a stage of the graphics processing pipeline that is immediately) before the rasterisation stage.

In an embodiment, the primitive set-up stage comes after any shader stages prior to the rasterisation stage and before rasterisation (and may be implemented as a stage prior to rasterisation, or as part of the rasteriser (but before rasterisation itself)).

Where the graphics processor and processing pipeline is a tile-based graphics processing pipeline, then the primitive set-up stage can be, and in an embodiment is, located after the tiling stage (the tiler) of the graphics processing pipeline. In this case, some processing using the primitive vertices in order to determine information that is to be used by the tiler to execute the tiling operation, such as deriving a bounding box for a primitive, may be performed (e.g. by the tiler) prior to the primitive set-up stage, if desired.

The information representing the primitive vertices that is provided to and used by the primitive set-up stage (process) to determine the edges representing the intersections of user defined clip planes with primitives can be any suitable and desired such information. It in an embodiment comprises vertex position data, and the distances to the user-defined clip planes for the vertices.

As discussed above, this vertex data is in an embodiment "vertex shaded" vertex attributes data (e.g. appropriately transformed vertex position data) provided and generated by a vertex shading stage of the graphics processing pipeline.

The primitive set-up stage (circuit) can use the vertex information (the (e.g. transformed) vertex position data and the vertex clip plane distances) to determine edge information representing the positions of the edges of any user-defined clip planes that intersect a primitive in any suitable and desired manner. This is in an embodiment done in a similar and corresponding manner to the way that the "actual" edges of a primitive are determined (in the graphics processor and graphics processing system in question).

(The primitive set-up stage may be (and in an embodiment is) configured to generate other data in addition to the edge information for a primitive, e.g., and in an embodiment, based on the information representing the vertices defining a primitive to be rendered. This other information may include, for example, depth equations and barycentric interpolation equations for the primitive.)

In the technology described herein, an edge representing the intersection of a primitive with a user-defined clip plane is determined and generated when a primitive is intersected by a user-defined clip plane.

It would be possible in this regard to always determine and generate an edge representing the position of the user-defined clip plane relative to a primitive, irrespective of whether the user-defined clip plane actually intersects the primitive or not. In this case, where the user-defined clip plane does intersect the primitive, then the edge representing the position of the user-defined clip plane relative to the primitive will represent the intersection of the primitive with the user-defined clip plane, but in the case where the user-defined clip plane does not actually intersect the primitive, the edge representing the position of the user-defined clip plane relative to the primitive will simply be an edge that represents the position of the user-defined clip plane relative to the primitive (rather than representing any actual intersection of the primitive by the user-defined clip plane).

In this case, the edge representing the position of any user-defined clip plane that does not actually intersect a primitive could still be tested in the appropriate manner in the rasteriser when rasterising a primitive, to thereby determine whether the primitive should be rendered or not on the basis of the user-defined clip plane.

Thus in one embodiment, the method of the technology described herein comprises, and the graphics processor is configured to (and comprises a processing circuit, e.g. primitive set-up circuit/stage, configured to), for a primitive to be rendered for a render output, determining, for each user-defined clip plane defined for the render output, an edge representing the position of the user-defined clip plane relative to the primitive;

and the rasteriser, when rasterising the primitive:

testing one or more regions of the render output being generated against one or more determined edges representing the position of a user-defined clip plane relative to the primitive, to determine whether the region or regions should not be rendered for the primitive on the basis of a user-defined clip plane.

In this case, where a primitive is actually, intersected by a user-defined clip plane, then the edge representing the position of the user-defined clip plane relative to the primitive will represent the intersection of the primitive with the user-defined clip plane, but for those user-defined clip planes that do not actually intersect the primitive, the edge representing the position of the user-defined clip plane relative to the primitive will not represent any intersection of the primitive with the user-defined clip plane, but will simply, represent the position of the user-defined clip plane relative to the primitive.

In this case, the rasteriser can then test the edges representing the positions of user-defined clip planes relative to a primitive for the primitive when rasterising the primitive, to determine whether and which parts of the primitive should be rendered or not on the basis of the user-defined clip plane(s).

In an embodiment, rather than determining and generating an edge representing the position of the user-defined clip plane relative to a primitive being rendered for all user-defined clip planes for the render output in question, irrespective of whether they intersect the primitive or not, edges are only generated for a primitive for a user-defined clip plane in the event that the user-defined clip plane actually intersects the primitive.

Thus, in an embodiment, for a, and in an embodiment for plural, and in an embodiment for each, user-defined clip plane being considered, it is first determined whether the user-defined clip plane actually intersects the primitive, and then an edge representing the intersection of the user-defined clip plane with the primitive is only determined and generated in the event that the user-defined clip plane actually intersects the primitive. Thus, before determining and generating for a user-defined clip plane, an edge representing the position of a user-defined clip plane relative to a primitive being rendered, it is first determined whether the user-defined clip plane actually intersects the primitive, and an edge representing the position of the user-defined clip plane relative to the primitive is only determined and generated in the event that it is determined that the user-defined clip plane actually intersects the primitive.

Thus, in an embodiment, the method of the technology described herein comprises (and the graphics processor is correspondingly configured to (and comprises a processing circuit or circuits configured to)):

for a primitive to be rendered for the render output:

determining for a user-defined clip plane defined for the render output, whether the primitive to be rendered is intersected by the user-defined clip plane defined for the render output; and (only) when it is determined that the primitive is intersected by the user-defined clip plane:

determining an edge representing the intersection of the primitive with the user-defined clip plane; and the rasteriser, when rasterising the primitive:

testing one or more regions of the render output being generated against the determined edge representing the intersection of the primitive with the user-defined clip plane to determine whether the region or regions should not be rendered for the primitive on the basis of the user-defined clip plane.

Thus in this case, only edges representing the intersections of primitives with user-defined clip plane s will be determined, and then used during the rasterisation process.

This is in an embodiment done for each user-defined clip plane defined for the render output in question for a primitive, to determine whether an edge needs to be determined (and then tested in the rasteriser) for the primitive in respect of any of the user-defined clip planes.

Whether a primitive is intersected by a user-defined clip plane can be determined in any suitable and desired manner. This is in an embodiment done by considering and using the distances to the user-defined clip pane defined for and associated with the vertices of the primitive in question, and in an embodiment using the signs of the distances to the user-defined clip plane defined for and associated with the vertices of the primitive in question.

In an embodiment, when all of the distances to the user-defined clip plane defined for and associated with the vertices of the primitive in question have the same sign (i.e. are either all positive or all negative) (and are non-zero) then it is determined that the user-defined clip plane does not intersect the primitive.

Correspondingly, when the distances to a given (the same) user-defined clip plane for different vertexes associated with a primitive differ in sign to each other, or the clip distance for at least one of the vertices is zero, it should be, and is in an embodiment, determined that the user-defined clip plane does intersect the primitive (such that an edge representing the intersection of the user-defined clip plane with the primitive should then be, and will then be, determined).

In these embodiments of the technology described herein, in the case where it is determined that a user-defined clip plane intersects a primitive, then an edge representing the intersection of the primitive with the user-defined clip plane will be determined (and then used during the rasterisation process). On the other hand, in the case where it is determined that a user-defined clip plane does not intersect the primitive, then an edge representing the intersection of the primitive with the user-defined clip plane should not be, and in an embodiment is not, determined (and, in an embodiment, no edge representing the position of the user-defined clip plane relative to the primitive is determined).

In an embodiment, in the case where it is determined that a user-defined clip plane does not intersect the primitive, it is then further determined whether to clip the primitive (cull the primitive from further processing) on the basis of the user-defined clip plane or not. This is in an embodiment done on the basis of the signs of the distances to the user-defined clip plane defined for and associated with the vertices of the primitive in question.

In an embodiment, when all of the distances to the user-defined clip plane defined for and associated with (all of) the vertices of the primitive in question are non-zero and have the same sign that is indicative of the vertex being on the "clipping" side of ("behind") the clip plane, then the primitive should be, and is in an embodiment, clipped (culled) from further processing on the basis of the user-defined clip plane (as the primitive will be entirely behind the clip plane in question).

Thus, in the case where a negative clip distance to a user-defined clip plane is taken to indicate (indicates) that the vertex having the negative clip distance is behind the clip plane, then in the case when all of the distances to the user-defined clip plane defined for and associated with all of the vertices for the primitive in question are non-zero and negative, the primitive in question is in an embodiment clipped (culled) from further processing.

Correspondingly, where all the clip plane distances for the vertices of a primitive to a user-defined clip plane are non-zero and have the same sign that indicates that the vertex position is in front of the clip plane, such that no clipping should be performed (e.g., and in an embodiment, are all non-zero and positive), then it can be and is in an embodiment, determined that the primitive should not be clipped (culled) at all in respect of that clip plane, and so that clip plane does not need to be considered further in relation to the primitive in question (and thus no edge representing that clip plane is required when rasterising the primitive, as it can be, and is in an embodiment, determined that the clip plane does not affect the processing of the primitive).

In the case where a clip plane distance for a vertex to a user-defined clip plane is 0, then in an embodiment, the vertex is consider to be visible (in front of the clip plane), such that no clipping should be performed for the vertex in respect of that clip plane. Thus in an embodiment, a distance of 0 to a clip plane is considered to be visible, and anything where the clip plane distance is less than 0 (i.e. strictly negative) is considered to be not visible (to be behind the clip plane). (Thus a fragment with an interpolated clip distance of exactly 0 should be considered to be, and treated as, visible.) In this case, where the derived clip plane distances can be signed zero (i.e. either −0 or +0), then both −0 and +0 are in an embodiment considered to be visible. In this case it may be necessary to consider more than just the sign (bit) to consider visibility. However in an embodiment, any clip distance of −0 is converted to +0 so as to allow the signs only to be checked. This conversion can be done, for example, and in an embodiment, in the vertex shader when the clip plane distances are being generated.

The determination of whether a user-defined clip plane intersects a primitive or not (and the consequent determination of whether to: cull (clip) the primitive based on the user-defined clip plane; determine an edge representing the intersection of the user-defined clip plane with the primitive; or simply pass the primitive for further processing based on the user-defined clip plane) can again be performed by any suitable and desired stage and circuit of the graphics processing (pipeline) and graphics processor, e.g., and in an embodiment, that is prior to the rasteriser.

In an embodiment, this determination is done by the primitive setup stage (circuit) that, as discussed above, will in an embodiment also determine any required edges representing the intersection of a user-defined clip plane with a primitive (where that is required).

Thus, in an embodiment, the primitive setup stage (circuit) determines whether a user-defined clip plane intersects a primitive to be rendered, and when it is determined that the user-defined clip plane intersects the primitive to be rendered, determines an edge representing the intersection of the user-defined clip plane with the primitive, but when it is other than (is not) determined that the user-defined clip plane intersects the primitive, either discards (culls) the primitive from further processing, or passes the primitive for further processing without determining an edge representing the intersection of the primitive with the user-defined clip plane question.

Where there are plural user-defined clip planes for a render output, it would be possible for it to be considered for all of the user-defined clip planes whether the user defined clip plane intersects the primitive in question or not. However, the Applicants have recognised that in the case where a primitive can be (entirely) clipped (culled) on the basis of a (particular) user-defined clip plane, then it would not be necessary for any consideration in respect of other user-defined clip planes to be performed.

Thus, in an embodiment, where there are plural user-defined clip planes for a render output, when and once it is determined that a primitive can be clipped (discarded) in its entirety on the basis of a (of one) user-defined clip plane, further (not yet completed) processing for the primitive for any other (e.g. as yet unconsidered) user-defined clip planes is omitted (stopped and/or not performed) (as appropriate). Thus in an embodiment any, and/or at least some, further (not yet completed) processing for a primitive in respect of a user-defined clip plane or planes is omitted (stopped and/or not performed) (as appropriate), when and once it is determined that the entire primitive can be clipped (discarded) on the basis of a user-defined clip plane.

This reduces the amount of processing that is performed where it can be determined that a primitive can be (entirely) culled on the basis of a user-defined clip plane.

In an embodiment, it is considered whether the user-defined clip planes intersect a primitive one-by-one (one after another, in turn), i.e. such that a next user-defined clip plane is only considered after it has been determined that the primitive cannot be entirely culled on the basis of a previous user-defined clip plane (in the above manner). In this way, any further processing in respect of user-defined clip planes can be avoided once (and if) it has been found that a primitive can be entirely culled on the basis of a user-defined clip plane.

As well as (potentially) determining an edge or edges representing the intersection of a primitive with a user-defined clip plane or clip planes for a primitive when generating the render output, as will be appreciated by those skilled in the art, it will also be necessary to determine the "normal" (actual) edges of a (the) primitive being processed for the rasterisation operation.

Thus the operation in the manner of the technology described herein in an embodiment comprises (and the graphics processor is in an embodiment correspondingly configured to) generating and determining edges representing the edges of the primitive to be rendered, in an embodiment in the form of edge information that represents the positions of the edges of the primitives.

Again, in an embodiment, this edge information comprises one or more line equations, each defining a respective edge of the primitive. In an embodiment a line equation is provided for each edge of the primitive. Again, the line equation for a (and for each) edge of the primitive is in an embodiment of the form:

$$Ax+By+C=0$$

where x and y are the position variables in the plane of the graphics render output, and A, B and C are constants.

Again, the edges (the line equations representing the edges) of the primitive are in an embodiment generated by, and as part of, a primitive setup stage (circuit) (process).

The edges (the line equations representing the edges) of the primitive can be determined in any suitable and desired manner, e.g., and in an embodiment, in accordance with the normal manner for determining primitive edges in the graphics processor and graphics processing system in question. This is in an embodiment done using the positions for the vertices of the primitive output by the vertex shader (the vertex shading stage).

It would be possible for the determination of the primitive edges and the clip plane edges to share some processing steps and results, if desired (and in one embodiment, that is what is done).

In one embodiment, the actual edges of the primitive are determined after any consideration of user-defined clip planes in respect of the primitive, e.g., and in an embodiment, such that the actual edges of the primitive will only be determined in the event that the primitive is not clipped (culled) already on the basis of a user-defined clip plane.

Thus, following the primitive setup stage, (and assuming that the primitive has not been clipped/culled already), in an embodiment a primitive will have defined for it and associated with it, a set of line equations (e.g three line equations where the primitive is a triangle) representing the (actual) edges of the primitive, together with, where user-defined clip planes are defined for the render output, zero or more line equations representing edges that represent user-defined clip planes (e.g., and in an embodiment, representing edges that represent the intersection of the primitive with a (given) user-defined clip plane(s)).

Once the primitive setup stage (process) has been completed for a primitive (and the primitive has not been culled), such that the primitive has defined for it and associated with it information representing the actual edges of the primitive, together with any edges representing (e.g. the intersection of the primitive with) a user-defined clip plane, the primitive can then be, and is in an embodiment, subjected to further processing, including being subjected to (passed to) the rasterisation process (the rasteriser) of the graphics processing operation (pipeline) for rasterising.

It will be appreciated in this regard that only those primitives that are not otherwise culled before reaching the rasteriser will be passed to and subjected to the rasterisation process of the graphics processing operation. Thus any primitives that are culled before rasterisation (e.g. because they are determined to be entirely behind a user-defined clip plane or otherwise culled), will not be passed to and subjected to the rasterisation process.

In this regard, it would be possible for the graphics processing of the technology described herein to include other culling tests and stages prior to the rasteriser, if desired, such as a determination of whether a primitive will fall within a view frustum of the whole or a region of the render output being generated or not, and/or the culling of primitives based on their facing direction (e.g. culling of back facing primitives). Any primitives that are not culled will then be subjected to rasterisation, which rasterisation will in the technology described herein consider, if necessary, both the actual edges of the primitive, together with any edges representing a user-defined clip plane for the primitive.

The rasteriser and rasterisation process in the technology described herein is operable to (configured to) test respective regions of a render output being generated against edges defined for a primitive to be rendered to determine whether all or part of the region should be rendered or not for the primitive on the basis of the edge being tested. In an embodiment, any region that it can be determined should not be rendered for a primitive on the basis of an edge test will be discarded (culled) in respect of (not processed further for) the primitive in question, but a region that cannot be discarded (culled) on the basis of the edge tests for a primitive will be processed further for the primitive in question.

The render output being generated should be, and is in an embodiment, represented as, and processed as, an (in an embodiment regular) array (grid) of sampling positions.

The regions of the render output being generated that are considered by the rasteriser and rasterisation process correspondingly should, and in an embodiment do, each correspond to a set of one, or of more than one, sampling position in the render output.

For example, each region may correspond to only one sampling position (a single sampling position) in the render output, or they may, and in an embodiment do, each correspond to a set of plural sampling positions (e.g. a 2×2 array of sampling positions).

In one embodiment, the regions of the render output that are considered by the rasteriser correspond to pixels to be generated (e.g. displayed). In another embodiment, the regions are larger than pixels and, e.g., and in an embodiment, each corresponds to an array of plural pixels (e.g. an array of 2×, 4×4, 8×8 or 16×16 pixels).

It would be possible to test a primitive (the primitives) at one particular (at a single) arrangement (level) of subdivision of the render output area into regions (e.g. to test at a pixel level, or a group of pixels level) only (and in one embodiment, that is what is done).

However, in an embodiment the rasterisation process of the technology described herein is performed as a "hierarchical" rasterisation process in which a (and each) primitive is tested against progressively smaller regions of the graphics render output area down to a minimum region size (corresponding, in an embodiment, to single pixels), discarding any regions that it can be determined from an edge test should not be processed further for the primitive.

In an embodiment therefore, primitives can be, and are in an embodiment, tested by the rasterisation process against plural respective subdivisions of the render output (area (sampling point grid)), with each such subdivision representing a given subdivision of the render output area into a set of regions of a given size, and each different subdivision dividing the render output area into a set of regions that are different in size to the other subdivisions of the render output area.

In this case therefore, there will be a first subdivision of the render output consisting of sets of sampling positions that each respectively correspond to a first subdivision of the render output area into (e.g., and in an embodiment, larger) regions, and at least one other subdivision of the render output consisting of sets of sampling positions that each respectively correspond to a second, different subdivision of the render output area into (e.g., and in an embodiment, smaller) regions (a subdivision of the render output area into regions that are different (and in an embodiment smaller) in size to the regions of the first subdivision of the render output area).

In an embodiment, there is one subdivision in which the render output area is divided into regions corresponding to individual pixels, and at least one other subdivision in which the render output area is divided into regions that are bigger than individual pixels (and that in an embodiment correspond to an array of plural pixels). Thus in this case, there will be one subdivision into sets of sampling positions in which each set corresponds to an individual pixel, and at least one other subdivision of the sets of sampling positions, in which each set of sampling positions corresponds to a region that is bigger than an individual pixel.

In an embodiment, a primitive is first tested against a subdivision that subdivides the render output area into larger (e.g. the largest) sized regions, and then if any region in that subdivision is determined as needing to be processed further for the primitive, the primitive will then be tested against a subdivision representing a smaller subdivision of the render output area into regions, and so on, until the smallest region subdivision (e.g. pixel subdivision) of the render output area is reached.

A primitive may be tested against the entire render output area (e.g. tile or entire frame) in the rasteriser, or sub-areas of the render output for which such render output region testing is then to be performed for a primitive could be identified, e.g. based on some approximation of the likely or expected position (coverage) of the primitive. In general, a primitive should be, and is in an embodiment, tested against plural render output regions (plural sets of sampling positions representing plural render output regions) in the rasteriser, which regions may correspond to some or all of the render output being generated.

In the technology described herein, the rasteriser and rasterisation process is operable to and configured to test respective regions of a render output being generated against the actual edges of a primitive being rasterised, and against any user-defined clip plane edges (e.g. representing the intersection of the primitive with a user-defined clip plane) associated with (determined for) the primitive.

To test a render output region against an edge for a primitive, the rasteriser and rasterisation process in an embodiment uses the edge information representing the edge in question to determine whether the render output region being tested is entirely outside the edge or not. This is in an embodiment done by determining whether a position or positions (e.g. a sampling position or positions) corresponding to the position of the render output region being tested are inside or outside the edge or not (with positions that are on the edge in question being determined to be inside or (entirely) outside the edge in accordance with the "tie break" rule that is being employed for the rasterisation process).

If a region completely "fails" the edge test, then it can be, and is in an embodiment, determined that the region is outside the edge in question and so therefore can be discarded (culled) from processing in respect of the primitive in question.

If some or all of a render output region "passes" the edge test (i.e the render output region is determined to be at least partially inside the edge in question) then it can be, and is in an embodiment, determined that the render output region cannot be discarded (culled) from processing for the primitive in question on the basis of the edge being tested.

More particularly, when testing regions of a render output against an actual edge of a primitive, in the case of hierarchical rasterisation operation, the result of the rasterisation processing when testing an actual edge of the primitive against any region other than the smallest region size is in an embodiment either to discard the region of the render output for the primitive in question in the case where the region being tested is entirely outside the actual edge of the primitive in question (i.e. (entirely) fails the edge test), or to subdivide the region of the render output in question into smaller regions and then test some or all of those smaller regions against the actual edge of the primitive in the case where at least part of the larger region is determined to lie inside the actual edge of the primitive being tested ("passes" the edge test) (and so on, until the smallest region size is reached).

Correspondingly, when testing the smallest (or only) subdivision of the render output area against an actual edge of a primitive, in an embodiment the rasterisation testing is so as to determine whether any sampling positions associated with the region of the render output being tested are inside the edge of the primitive being considered, and then either discarding the region of the render output in question from further processing for the primitive, or generating an appropriate fragment for further processing (e.g., and in an embodiment, rendering) of the primitive in respect of the region of the render output area in question, accordingly.

In an embodiment the rasteriser operates to test the actual edges of a primitive against the sampling positions of a (and of each) smallest region of the render output to be tested for the primitive, to determine if at least one sampling position of the set of sampling positions for the region is covered by the primitive. If so, then a fragment corresponding to the render output region in question is generated for the primitive and sent onwards for processing. If no sampling positions for a region being tested are covered by a primitive, then it is determined that the region does not need to be processed further for the primitive in question (and so no fragment is generated for the primitive in respect of the region).

The testing of a region of a render output being generated against a user-defined clip plane edge for a primitive (e.g. an edge representing the intersection of the primitive with a user-defined clip plane), where required, can be performed in any suitable and desired manner by the rasteriser.

In an embodiment, this testing is performed in a similar and corresponding manner to the way that the rasteriser and the rasterisation process tests regions of the render output against the actual edges of a primitive.

Thus, to test a render output region against a user-defined clip plane edge for a primitive, the rasteriser and rasterisation process in an embodiment uses the edge information representing the edge in question to determine whether the render output region being tested is entirely outside the edge or not. This is in an embodiment done by determining whether a position or positions (e.g. a sampling position or positions) corresponding to the position of the render output region being tested are inside or outside the edge or not (with positions that are on the edge in question being determined to be inside or (entirely) outside the edge in accordance with the "tie break" rule that is being employed for the clip plane and rasterisation process in an embodiment, positions that are on the edge are considered to be inside the edge (in front of the corresponding user-defined clip plane), and therefore visible)).

If a region completely "fails" the edge test, then it can be, and is in an embodiment, determined that the region is outside the edge in question (and thus "behind" the user defined clip plane in question) and so therefore can be discarded (culled) from processing in respect of the primitive in question.

If some or all of a render output region "passes" the edge test (i.e. the render output region is determined to be at least partially inside the edge in question) then it can be, and is in an embodiment, determined that the render output region cannot be discarded (culled) from processing for the primitive in question on the basis of the edge being tested.

The result of the rasterisation testing of a region of a render output against a user-defined clip plane edge (e.g., and in an embodiment, an edge representing the intersection of a primitive with a user-defined clip plane) should be, and is in an embodiment, used to determine whether the region of the render output in question should not be rendered for the primitive on the basis of the user defined clip plane (i.e. whether the region can be culled (discarded) from any further processing in respect of the primitive on the basis of the user-defined clip plane).

In an embodiment if the rasterisation testing of a region against a user-defined clip plane edge (e.g. an edge representing the intersection of a primitive with the user-defined clip plane) determines that the region should be culled (should not be rendered) on the basis of the user-defined clip plane (i.e. it is behind (outside) the user-defined clip plane) (i.e. the region (entirely) fails the user-defined clip plane edge "edge test"), then it is determined that the region should not be rendered for the primitive (at all), and so the region is discarded in respect of the primitive in question.

On the other hand, when the testing of a region against a user-defined clip plane edge (e.g. an edge representing the intersection of a primitive with a user-defined clip plane) determines that the region is at least partly inside (is at least partly in front of) the user-defined clip plane (i.e. at least part of the region passes the edge test for the user-defined clip plane edge), then it can be, and is in an embodiment, determined that the region should not be discarded on the basis of the user-defined clip plane in question (i.e. the region cannot and should not be excluded from further processing (rendering) on the basis of that particular user-defined clip plane).

Thus, in the case of a hierarchical rasterisation operation when testing user-defined clip plane edges against larger regions of the render output, the result of the testing is in an embodiment used either to discard the larger region being tested in its entirety for the primitive in question, or to determine to subdivide the region of the render output in question into smaller regions and then test the user-defined clip plane edge against some or all of those smaller regions (and so on, as appropriate, until the smallest region subdivision is reached).

Correspondingly, when testing a user-defined clip plane edge against the smallest (or only) subdivision (e.g. pixel subdivision) of the render output area, in an embodiment the result of the user-defined clip plane edge test is used to discard or not the region in question in respect of the primitive in question.

While it would be possible when considering any user-defined clip plane edges for a primitive to consider and test a different set and configuration of render output regions to the render output regions that are tested when considering the actual edges of a primitive, in an embodiment any user-defined clip plane edges for a primitive are tested against the same regions (the same configuration of regions) as the rasteriser uses for and with the actual edges of a primitive. Thus, in an embodiment, the same render output regions and render output region configuration is used when considering both the actual edges of a primitive and any user-defined clip plane edges for the primitive.

Correspondingly, where the rasteriser and rasterisation process is otherwise configured to be performed in a "hierarchical" manner as discussed above, then in an embodiment any user-defined clip plane edges are also tested against regions of the render output in a hierarchical manner, i.e. such that a (and each) user-defined clip plane edge is tested against progressively smaller regions of the graphics render output area down to a minimum size region, as appropriate.

It will be appreciated that in order to (finally) determine that a render output region should be processed further (rendered) for a given primitive, it will be necessary for the rasteriser and rasterisation process to consider ail the edges associated with the primitive (to determine whether the render output region passes the edge test for all the edges associated with the primitive).

In particular, where a primitive has one or more user-defined clip plane edges (e.g. each representing the intersection of a respective user-defined clip plane with the primitive) associated with it, the rasterisation process and the rasteriser will need to consider both the actual edges of the primitive (e.g. three edges in the case of a triangle) and the user-defined clip plane edge or edges when determining whether a given render output region should be rendered for the primitive or not. (In the case where there are no user-defined clip plane edges associated with a primitive then only the actual edges of the primitive need to be and will be considered by the rasteriser.)

For example, even if a render output region "passes" the edge test for an edge representing the intersection of a primitive with a user-defined clip plane (i.e. such that it cannot be determined to cull the primitive for the region on the basis of that user-defined clip plane), it will still be necessary to test the region in question against any other user-defined clip plane edges for the primitive, and against the actual edges of the primitive, to determine whether the region should actually be rendered for the primitive or not. Only if the region passes all the edge tests, should it actually be rendered for the primitive.

To facilitate this, a (and each) render output region being considered for a primitive is in an embodiment tested against all the edges for the primitive that need to be considered (i.e. the actual edges of the primitive, and any user-defined clip plane edges for the primitive) altogether so that the region can either be discarded (culled or further processed for the primitive in question on the basis of all the edges being considered.

Thus for a given primitive, the regions of the render output to be tested for that primitive are in an embodiment tested on a region-by-region basis, one after another, against all the edges associated with the primitive (both the actual edges of the primitive and any user-defined clip plane edges), rather than, for example, testing a first edge against all the regions, and then testing a next edge against all the regions to be considered, and so on.

It will be appreciated therefore that a given region of the render output will (typically, and in an embodiment) fall to be tested in the rasteriser against plural edges for a primitive (being one or more actual edges for the primitive, and, potentially, one or more user-defined clip plane edges for the primitive).

It would be possible in this regard to test a region of the render output against all the edges for a primitive and then determine whether to discard the region or not once it has been tested against all the edges for the primitive. However, the Applicants have again recognised that in the case where a render output region can be (entirely) culled on the basis of a particular edge for a primitive (whether an actual edge the primitive or a user-defined clip plane edge for a primitive) then it would not be necessary for any testing in respect of other edges for the primitive to be performed.

Thus, in an embodiment, when and once it is determined that a render output region can be discarded in its entirety on the basis of a (of one) edge of a primitive, further processing for the render output region for the primitive is stopped and/or not performed (as appropriate). Thus in an embodiment any, and/or at least some, further (not yet completed) rasterisation processing for a render output region in respect of an edge or edges for the primitive is in an embodiment omitted (stopped and/or not performed) (as appropriate), when and once it is determined that the entire render output region can be discarded (culled) for a primitive on the basis of an edge associated with a primitive.

Correspondingly, in an embodiment, a render output region being considered is in an embodiment tested against the edges for a primitive one-by-one (one after another, in turn), i.e. such a next edge is only considered after it has been determined that the render output region cannot be entirely culled on the basis of a previous edge for the primitive. In this way, (any) further processing in respect of edges for a primitive can be avoided once (and if) it has been found that a render output region can be entirely culled on the basis of a primitive edge.

Thus, in an embodiment, the edges for a primitive are considered for a render output region in turn, and in the case that the render output region can be discarded on the basis of a primitive edge, no further processing for the render output region in respect of any further (as yet unconsidered) edges (if any) for the primitive (or otherwise) is performed.

In this case, in an embodiment any user-defined clip plane edges for a primitive are considered first (and in an embodiment in turn) for a render output region being tested, before the actual edges of the primitive are considered for the region (i.e. such that the actual edges of a primitive will only be considered for a render output region when and once the render output region has "passed" the tests against any user-defined clip plane edges for the primitive).

This reduces the amount of processing that is performed where it can be determined that a render output region can be (entirely) culled for a primitive on the basis of a user-defined clip plane edge.

The rasteriser can be controlled and triggered to perform the various required edge tests (both for the actual edges of the primitive and any user-defined clip plane edges for a primitive) in any suitable and desired manner. This is in an embodiment done in the normal manner for controlling the operation of the rasteriser in the graphics processor and graphics processing pipeline in question.

Thus, the edges that are to be tested for a primitive (whether the actual edges of the primitive or user-defined clip plane edges for the primitive) are in an embodiment conveyed to and indicated to the rasteriser in the same way, and are in an embodiment defined in the same way, e.g., and in an embodiment, by, as discussed above, providing the appropriate line equation (edge equation) coefficients for the edges to the rasteriser.

It will be appreciated from the above that the rasteriser when testing render output regions against any user-defined clip plane edges associated with a primitive will identify those render output regions that should not be rendered for a primitive on the basis of the defined user-defined clip plane or planes defined for the render output being generated.

The testing of the actual edges of a primitive will correspondingly determine for any regions that are not excluded by (culled on the basis of) a user-defined clip plane, whether the primitive in question at least partly covers the region (such that the region should be rendered for the primitive in question).

Thus, the rasterisation process in the embodiments of the technology described herein at least, will operate to identify regions of the render output that are not to be clipped (culled) from processing for a primitive on the basis of a user-defined clip plane, and which are at least partly covered by the primitive being rasterised (e.g., and in an embodiment, for which at least one sampling position associated with the region is covered by the primitive being rasterised).

For any unculled regions that include a (at least one) sampling position covered by the primitive being rasterised, a graphics fragment that will be used to render the primitive at the sampling position(s) in question should then be, and is in an embodiment, generated (and issued to the remainder of the graphics processing pipeline for processing).

Thus, the rasteriser and rasterisation process will, in effect, operate to determine the sampling positions that should be used to represent a primitive in the render output being generated, e.g. frame to be displayed, (i.e. the (x, y) positions of the sample positions to be used to represent the primitive in the render output), and generate one or more graphics fragments corresponding to the sample positions that are covered by a primitive.

(Each graphics fragment that the rasteriser generates for a primitive correspondingly will have one or more sampling positions of the render output being generated associated with it (i.e. such that sampling positions covered by a primitive will be, in effect, processed as fragments that will be used to render the primitive at the sampling positions in question). (Each fragment that is generated and processed may, e.g., represent a single sampling position or a set of plural sampling positions, depending upon how the rasteriser and rasterisation process is configured.))

Thus, for any regions of the render output that are being tested for a primitive and that pass all the edge tests for the primitive (i.e. are not determined to be culled on the basis of any of the edges being tested for the primitive (or otherwise)), an appropriate fragment or fragments for rendering the primitive for the region will be generated and issued to the remainder of the graphics processing operation (pipeline) for processing.

The fragments (if any) issued by the rasteriser for a primitive will be, and are in an embodiment, then subjected to further (fragment) processing.

The further processing that fragments issued by the rasteriser undergo can be suitable and desired processing, and in an embodiment comprises the normal processing that fragments issued by the rasteriser will undergo in the graphics processor and graphics processing pipeline in question.

Correspondingly, there will be, and is in an embodiment, one or more fragment processing stages (circuits) following the rasteriser which can be any suitable and desired graphics processing pipeline stages that can perform fragment processing (e.g. rendering) steps (operations) in respect of fragments generated by the rasteriser.

The one or more fragment processing stages that follow the rasteriser may comprise, for example, one or more of, and in an embodiment plural of, and in an embodiment all of: a fragment buffer that is operable to issue fragments to a next stage of the graphics processing pipeline; an early depth and/or stencil testing stage (circuit) that is operable to perform a depth and/or stencil test; a renderer (rendering circuit) that is operable to render fragments to generate rendered fragment data (the fragment rendering may comprise, for example, texture mapping, blending, fragment shading, ray-tracing, etc.); a late depth and/or stencil testing stage (circuit) that is operable to perform a depth and/or stencil test; one or more tile buffers (in a tile-based graphics processor and graphics processing pipeline); and a write out stage (circuit) operable to write (output) data from the, e.g. tile buffers (etc.) to other storage, such as a (main) memory.

Thus the fragments issued by the rasteriser may, for example, and in an embodiment, undergo some further culling testing (e.g. depth testing) to determine whether they should be culled from rendering.

Any fragments that pass this further culling testing (if any), are in an embodiment then rendered (passed to a renderer (a rendering circuit (stage)) for rendering).

The rendering process (the renderer) should, and in an embodiment does, determine the appearance each sampling position for a fragment that is covered by a primitive should have (e.g. in terms of its colour, etc.) to represent the primitive at that sampling position. Thus the rendering process in an embodiment derives the data, such as red, green and blue (RGB) colour values and an "alpha" (transparency) value, necessary to represent the primitive at the sampling positions covered by the primitive (i.e. "shades" each sampling position for a fragment that is covered by the primitive in question). This can involve, for example, performing fragment shading, applying textures, blending sample position data values, etc.

The rendering process can be, and is in an embodiment, performed in the normal manner for the graphics processor and graphics processing pipeline in question, and in an embodiment comprises (at least) performing fragment shading for the fragments.

Once the rendering process (e.g. fragment shading) has been completed for a fragment, then the fragment can undergo any further desired processing, such as a late depth and/or stencil test, with any rendered fragments (rendered fragment data) for a primitive that is not culled then being appropriately stored, either in main memory, or, in the case of a tile-based graphics processor (and graphics processing pipeline), in a tile buffer for subsequently writing out to other storage (e.g. main memory) once the rendering of the tile has been completed (and assuming that the rendered fragment data is not replaced by data of later fragments in the tile buffer).

Other arrangements would, of course, be possible.

Although the technology described herein has been described above with particular reference to the processing in respect of a given (single) primitive being considered for a render output, it will be appreciated that the processing in the manner of the technology described herein should be, and is in an embodiment, performed for plural primitives, and in an embodiment for each primitive of a set of plural primitives to be rendered (for a render output), as appropriate.

Thus the operation in the manner of the technology described herein will in an embodiment be performed for plural primitives to be rendered for a render output, with those primitives either being rendered appropriately and/or all or in part discarded from rendering, based on any user-defined clip planes, and the testing of the primitive edges and any user-defined clip plane edges to be considered.

It will be appreciated from the above that the technology described herein concerns in particular the handling of user-defined clip planes. As discussed above, there may also, for example, be other clip planes, such as screen space and view port (e.g. near and far) clip planes, to be considered as well. Such further clip planes can be handled in any suitable and desired manner, for example in the normal manner for handling such clip planes in the graphics processor and graphics processing system in question. Thus while it would, if desired, be possible to handle some or all of such further clip planes in the manner of the technology described herein (by defining edges representing the position/intersection of the clip plane with a primitive), that is not necessary, and other clip planes can be handled in an alternative manner, such as in the normal manner for the graphics processor and graphics processing system in question, if desired.

A number of modifications and variations to the operation in the manner of the technology described herein would be possible, if desired.

For example, in the case of a tile-based graphics processing system, the tiler and tiling process could be used to, and operate to, determine whether an edge representing the intersection of a user-defined clip plane with a primitive intersects a tile or not, and to discard a primitive from processing for the tile in question (at the tiling stage) (by not including the primitive in a primitive list for the tile) when an edge equation representing the intersection of a user-defined clip plane with a primitive does not actually intersect the tile being considered. In one embodiment, this is done.

It would also be possible in the case of a tile-based graphics processor and graphics processing pipeline for the tiler (the tiling operation) to perform the determination of whether a primitive should be clipped (discarded) in its entirety on the basis of a user-defined clip plane, e.g. instead of the primitive setup stage/circuit (potentially) performing that operation (as discussed above).

In this case, the tiler (the tiling process) could correspondingly receive and consider all the clip distance data for the vertices of a primitive and determine from the signs of the clip plane distances for the vertices of the primitive whether the primitive should be discarded or not (and include or not include the primitive in any primitive lists accordingly).

In an embodiment, the tiler is provided solely with the signs of the clip distances to each vertex for this determination (rather than the full clip distances). This reduces the amount of data that is provided to and required by the tiler to perform the clipping decision (and avoids, for example, the tiler having to read the full clip distance data to perform the clipping decision, which data the tiler would not normally otherwise require).

In this case, in an embodiment, any values of −0 are in an embodiment flushed (converted) to +0, so that the tiler can use the signs of the clip distances only for this determination. If that is not done, then the tiler may be configured to check for zero as a special case.

In this case, in order to facilitate this operation, in an embodiment the vertex shading operation (that determines the clip distances to the user-defined clip plane or planes for each vertex) is in an embodiment configured to generate (output) a (separate) indication of the signs only of the clip distances for each vertex, which sign information (alone) can then be provided to (read by) the tiler and used to determine whether a primitive can be entirely discarded on the basis of a user-defined clip plane based on the signs of the clip distances for the vertices of the primitive to the user-defined clip plane (as discussed above). (As discussed above, this sign information generation may in an embodiment include converting any values of −0 to +0 when generating the sign information.) For example, the vertex shader could output for each vertex, an appropriate bit mask of the sign bits of the clip distances for each vertex. (e.g. an 8-bit bit mask of the sign bits for the clip distances for each vertex where eight user-defined clip planes are supported). The tiler could then use the sign bit bit masks for each vertex of a primitive to determine whether the primitive is entirely behind a user-defined clip plane (and so can be culled) or not, for example, and in an embodiment, by ANDing the sign bit bit masks for each vertex of the primitive together.

It would also be possible to "consolidate" (rationalise) edges representing the position/intersection of user defined clip plane s with a primitive where it can be determined that it is possible to do that, for example by omitting (not considering) a user-defined clip plane edge that would be entirely "clipped" by another user-defined clip plane in any event. This could reduce the number of edges representing the position/intersection of a primitive with a user-defined clip plane that need to be considered by the rasteriser for a primitive.

This could be done, for example, and in an embodiment, where two edges representing the position/intersection of different user-defined clip planes with a primitive are parallel to each other, and the clip planes have the same "clipping" "orientation" (have their "normal vectors" in the same orientation) (i.e. such that the clip planes have the same "behind" ("outside")). In this case, a clip plane edge that is already outside another clip plane edge could then be discarded (not considered), as the first clip plane edge will act to cull any render output regions that would be outside the second clip plane edge in any event.

Subject to the particular operation in the manner of the technology described herein in relation to user-defined clip planes, the graphics processor and graphics processing pipeline can otherwise operate in any suitable and desired manner, for example, and in an embodiment, in the normal manner for the graphics processor and graphics processing pipeline in question.

Correspondingly, as well as the particular elements, stages, circuits, etc., described above with particular reference to the operation in the manner of the technology described herein, the graphics processor and graphics processing pipeline may otherwise include any suitable and desired elements, circuits, processing stages, etc., that a graphics processor and graphics processing pipeline may normally comprise.

Thus, the graphics processor and graphics processing pipeline may, and in an embodiment does, also comprise one or more programmable shading stages, such as one or more of, and in an embodiment all of, a vertex shading stage (circuit), a hull shader (circuit), a tessellation stage (circuit) (e.g. where tessellation is performed by executing a shader program), a domain (evaluation) shading stage (circuit) (shader), a geometry shading stage (shader) (circuit), and a fragment shader (circuit).

The graphics processor and graphics processing pipeline may also contain any, other suitable and desired processing stages (circuits) that a graphics processor and processing pipeline may contain, such as a depth (or depth and stencil) tester(s) (circuit(s)), a blender (blending circuit), a tile buffer or buffers, a write out unit (circuit), etc.

It will furthermore be appreciated that the graphics processor of the technology described herein may be part of an overall graphics processing system that includes, and in an embodiment, a host processor (e.g. CPU) that, e.g., executes applications that require (graphics) processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor. The host processor may also execute a compiler or compilers for compiling programs to be executed by (e.g., a programmable processing stage (shades) of the) graphics processor.

The graphics processor may also comprise, and/or be in communication with, one or more memories and/or memory devices that store the data described herein, and/or the output data generated by the graphics processor, and/or store software (e.g. programs) for performing the processes described herein. The graphics processor may also be in communication with a host microprocessor, and/or with a display for displaying images based on the data generated by the graphics processor.

The technology described herein can be used in and with any suitable and desired graphics processing system and pipeline.

The technology described herein is particularly suitable for use with tiled renderers (tile-based graphics processors and graphics processing pipelines). Thus, in an embodiment, the graphics processor and graphics processing pipeline is a tiled-based graphics processor and graphics processing pipeline.

Correspondingly, the graphics processor and graphics processing pipeline in an embodiment renders an overall render output, e.g. frame to be displayed, as a set of respective rendering tiles that the render output has been divided into, with each respective rendering tile being processed and rendered separately, and output, e.g. to a frame buffer in memory, for subsequent use (e.g. for display).

Thus, the graphics processor in an embodiment includes one or more tile buffers that store rendered data for a rendering tile being rendered, until the rendering of the rendering tile has been completed, and a write out circuit coupled to the tile buffer(s) for writing completed rendering tiles to other storage, such as a frame buffer in external memory, for use.

The technology described herein can be used for all forms of output that a graphics processor and graphics processing pipeline may be used to generate. For example, the graphics processor may generate frames for display, render to texture outputs, etc. The output data values from the processing are in an embodiment exported to external, e.g. main, memory, for storage and use, such as to a frame buffer for a display.

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably operable microprocessor based system. In some embodiments, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on one or more data processors, a computer program element comprising computer software code portions for performing the methods herein described when the program element is run on one or more data processors, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising one or more data processors causes in conjunction with said data processor(s) said processor, renderer or system to carry out the steps of the methods of the technology described herein. Such a computer software carrier could be a non-transitory physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The technology described herein and present embodiments relate to computer graphics processing.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

Graphics processing is typically carried out in a pipelined fashion, with one or more pipeline stages operating on the data to generate the final render output, e.g. frame that is displayed.

Figures 3, 4:
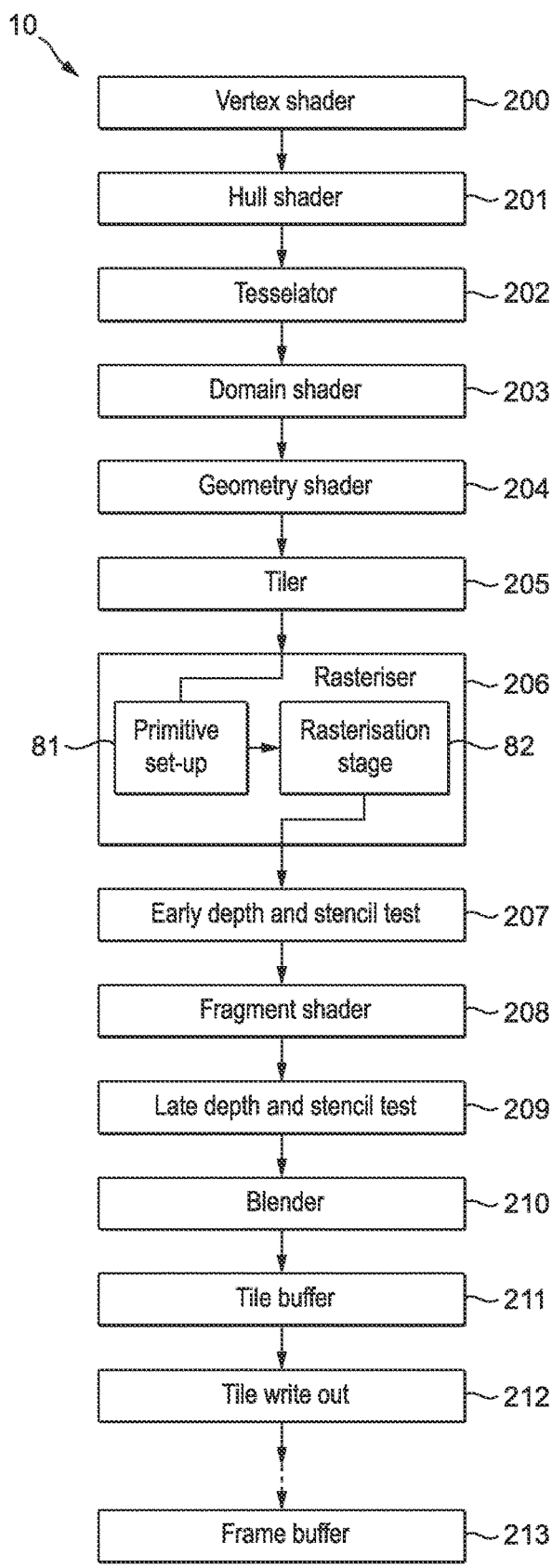
FIG. 3 illustrates schematically an exemplary graphics processing pipeline.
FIG. 4 illustrates schematically a typical computer graphics processing system.

FIG. 3 shows an exemplary graphics processing pipeline 10 that may be executed by a graphics processor (graphics processing unit (GPU)).

The graphics processing pipeline 10 shown in FIG. 3 is a tile based renderer and will thus produce tiles of a render output data array, such as an output frame to be generated.

FIG. 3 shows the main elements and pipeline stages of the graphics processing pipelines. As will be appreciated by those skilled in the art, there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processing pipeline as shown in FIG. 3 may be implemented as desired and will accordingly comprise, e.g., appropriate circuits/circuitry and/or processing logic, etc., for performing the necessary operation and functions.

Correspondingly the graphics processor that is executing the graphics processing pipeline in FIG. 3 will include appropriate circuits/circuitry and/or processing logic, etc., such as, and in an embodiment, one or more programmable processing circuits, and/or one or more fixed function processing circuits, appropriate storage (e.g. registers, caches and memories, etc.) etc., for performing the necessary pipeline operations and functions.

The graphics processing pipeline 10 shown in FIG. 3 includes a number of stages, including a vertex shader 200, a hull shader 201, a tesselator 202, a domain shader 203, a geometry shader 204, a tiler 205, a rasteriser 206, an early Z (depth) and stencil test stage 207, a renderer in the form of a fragment shading stage 208, a late Z (depth) and stencil test stage 209, a blending stage 210, a tile buffer 211 and a downsampling and writeout (multisample resolve) stage 212.

The vertex shader 200 takes the input data values (vertex attribute values) associated with the vertices, etc., defined for the output to be generated, and processes those data values to generate a set of corresponding "vertex shaded" output data values for use by subsequent stages of the graphics processing pipeline 10.

For a given output to be generated by the graphics processing pipeline, there will typically be a set of vertices defined for the output in question. The primitives to be processed for the output will then be indicated as comprising given vertices in the set of vertices for the graphics processing output being generated.

The vertex shading operation operates to transform the attributes for each vertex into a desired form for the subsequent graphics processing operations. This may comprise, for example, transforming vertex position attribute values from the world or user space that they are initially defined for to the screen space that the output of the graphics processing system is to be displayed in, modifying the input data to take account of the effect of lighting in the image to be rendered, etc.

The vertex shading operation may also convert the originally defined vertex position coordinates to a different, e.g., lower precision, form to be used later on in the graphics processing pipeline.

The hull shader 201 performs operations on sets of patch control points and generates additional data known as patch constants. The tessellation stage 202 subdivides geometry to create higher order representations of the hull, and the domain shader 203 performs operations on vertices output by the tessellation stage (similar to a vertex shader). The geometry shader 204 may (if run) generate primitives such as a triangles, points or lines for processing.

Once all the primitives to be rendered have been appropriately processed, e.g. transformed, and/or, e.g., generated by the geometry shader, the tiler 205 then determines which primitives need to be processed for each tile that the render output has been divided into for processing purposes. To do this, the tiler 205 compares the location of each primitive to be processed with the tile positions, and adds the primitive to a respective primitive list or lists for each tile that it determines the primitive could (potentially) fall within. The tiler may, e.g., prepare primitive lists corresponding to single rendering tiles, and/or to sets of plural rendering tiles (e.g. in the case of "hierarchical tiling" arrangements), as desired. Any suitable and desired technique for sorting and binning primitives into tile lists, such as exact binning, or bounding box binning, or anything in between, can be used for the tiling process.

Once the tiler has completed the preparation of the primitive tile lists (lists of primitives to be processed for the tiles), then each tile can be rendered.

To do this, each tile is processed by the graphics processing pipeline stages shown in FIG. 3 that follow the tiler 205.

Thus, when a given tile is being processed, each primitive that is to be processed for that tile (that is listed in a tile list for that tile) is passed to the rasteriser 206.

The rasteriser 206 of the graphics processing pipeline 10 operates to rasterise the primitives into individual graphics fragments for processing.

To do this, the rasteriser 206, particularly a primitive set-up stage 81 of the rasteriser 206, operates to determine, from the vertex-shaded vertices provided to the primitive set-tip stage 81, edge information representing each primitive edge of a primitive to be rasterised. This edge information is then passed to a rasterisation stage 82 of the rasteriser 206, which rasterises the primitive to sampling points and generates graphics fragments having appropriate positions (representing appropriate sampling positions) for rendering the primitive.

(It will be appreciated that although FIG. 3 shows the primitive set-up stage 81 being part of a single rasterisation unit (the rasteriser 206 of FIG. 3), this is not required. It is possible for the primitive set-up stage to be separate from the rasteriser 206, e.g. at a stage of the graphics processing pipeline that is (e.g. immediately) before the rasteriser 206, but after the tiler 205.)

The fragments generated by the rasteriser are then sent onwards to the rest of the pipeline for processing.

The early Z/stencil stage 207 performs a Z (depth) test on fragments it receives from the rasteriser 206, to see if any fragments can be discarded (culled) at this stage. To do this, it compares the depth values of (associated with) fragments issuing from the rasteriser 206 with the depth values of fragments that have already been rendered (these depth values are stored in a depth (Z) buffer that is part of the tile buffer 21) to determine whether the new fragments will be occluded by fragments that have already been rendered (or not). At the same time, an early stencil test is carried out.

Fragments that pass the fragment early Z and stencil test stage 207 are then sent to the fragment shading stage 208. The fragment shading stage 208 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 208 is in the form of a shader pipeline (a programmable fragment shader).

There is then a "late" fragment Z and stencil test stage 209, which carries out, inter alia, an end of pipeline depth test on the shaded fragments to determine whether a rendered fragment will actually be seen in the final image. This depth test uses the Z buffer value for the fragment's position stored in the Z-buffer in the the buffer 211 to determine whether the fragment data for the new fragments should replace the fragment data of the fragments that have already been rendered, by comparing the depth values of (associated with) fragments issuing from the fragment shading stage 208 with the depth values of fragments that have already been rendered (as stored in the depth buffer). This late fragment depth and stencil test stage 209 also carries out any necessary "late" alpha and/or stencil tests on the fragments.

The fragments that pass the late fragment test stage 209 are then subjected to, if required, any necessary blending operations with fragments already stored in the tile buffer 211 in the blender 210. Any other remaining operations necessary on the fragments, such as dither, etc. (not shown) are also carried out at this stage.

Finally, the (blended) output fragment data (values) are written to the tile buffer 211 from where they can, for example, be output to a frame buffer 213 for display. The depth value for an output fragment is also written appropriately to a Z buffer within the tile buffer 211.

(The tile buffer stores colour and depth buffers that store an appropriate colour, etc., or Z value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).)

The tile buffer is provided as part of RAM that is located on (local to) the graphics processing pipeline (chip).

The data from the tile buffer 211 is input to a downsampling (multisample resolve) write out unit 212, and thence output (written back) to an external memory output buffer, such as a frame buffer 213 of a display device (not shown). (The display device could comprise, e.g., a display comprising an array of pixels, such as a computer monitor or a printer.)

The downsampling and writeout unit 212 downsamples the fragment data stored in the tile buffer 211 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer 213 in a main memory) for storage, the next tile is then processed, and so on, until sufficient tiles have been processed to generate the entire render output (e.g. frame (image) to be displayed) The process is then repeated for the next render output (e.g. frame) and so on.

The graphics processing pipeline (and the graphics processor that implements the graphics processing pipeline) also includes and/or has access to (is in communication with) appropriate storage, e.g. memory, for storing the data that the graphics processing will use and/or generate, such as appropriate buffers, etc.

Other arrangements for the graphics processing pipeline would, of course, be possible.

The graphics processing pipeline as illustrated in FIG. 3 will be executed on and implemented by an appropriate graphics processing unit (GPU) (graphics processor) that includes the necessary functional units, processing circuitry, etc., operable to execute the graphics processing pipeline stages.

In order to control a graphics processor (graphics processing unit) that is implementing a graphics processing pipeline to perform the desired graphics processing pipeline operations, the graphics processor will typically receive commands and data from a driver, e.g. executing on the host processor, that indicates to the graphics processor the operations that it is to carry out and the data to be used for those operations.

Accordingly, as shown in FIG. 4 (which shows a typical computer graphics processing system), an application 320, such as a game, executing on a host processor 310 that requires graphics processing operations to be performed by an associated graphics processing unit (graphics processing pipeline) 330, will generate appropriate API (Application Programming Interface) calls that are interpreted by a driver 340 for the graphics processor 330 that is running on the host processor 310 to generate appropriate instructions to the graphics processor 330 to generate graphics output required by the application 320. To facilitate this, a set of instructions will be provided to the graphics processor 330 in response to instructions from the application 320 running on the host system 310 for graphics output (e.g. to generate a frame to be displayed).

As discussed above, some graphics processing APIs support the use of user-defined clip planes, which are clip planes that the application programmer can define to clip (cull) regions of a render output from rendering.

In the present embodiments, when a user-defined clip plane is defined for a render output being generated, it is determined for each primitive being rendered, whether the user-defined clip plane intersects the primitive or not, and if the user-defined clip plane does intersect the primitive, an edge representing the intersection of the clip plane with the primitive is determined, and then tested for the primitive as an additional edge test in the rasteriser when rasterising the primitive.

Figure 5:
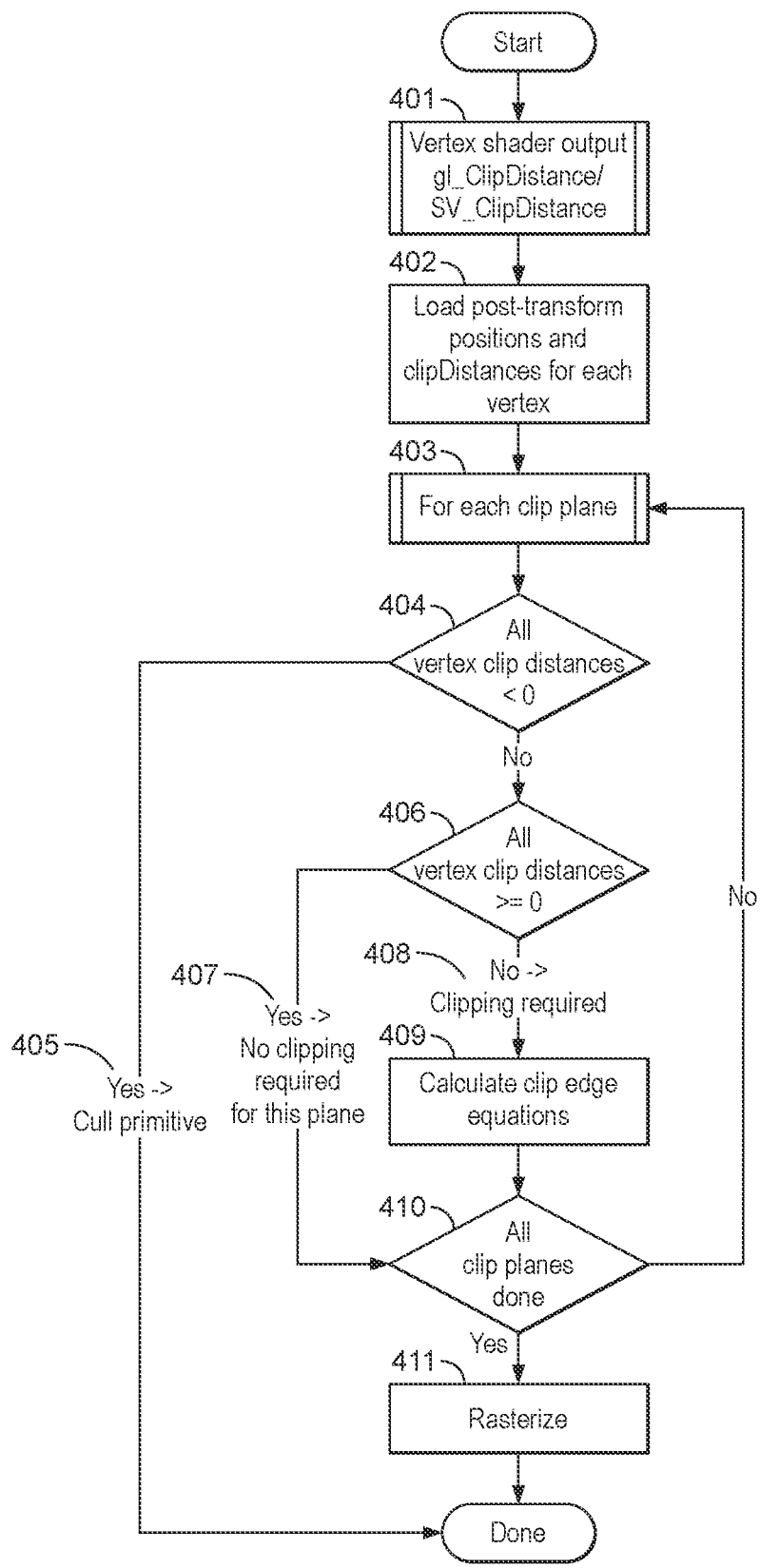
FIG. 5 shows part of the processing for user-defined clip planes in an embodiment of the technology described herein.

FIG. 5 shows this operation in the present embodiments.

As shown in FIG. 5, when a user-defined clip plane is defined for a render output being generated, then the vertex shader 200 will, inter alia, also generate for each vertex defined for the render output a "clip distance", representing the distance from the vertex to the user-defined clip plane in question (step 401). (A vertex will have a clip distance generated for it by the vertex shader for each user-defined clip plane that is defined for the render output in question. Thus each vertex may have associated with it plural clip distances, one for each user-defined clip plane that is to be considered.)

The primitive setup circuit 81 will then load the post-transformation vertex positions and clip distances generated by the vertex shader 200 (and any subsequent shading stages of the graphics processing pipeline 10) for each vertex for a primitive to be processed (step 402).

Then, for a given user-defined clip plane to be considered (step 403), the primitive setup unit 81 will first determine whether the clip distances for all the vertices for the primitive in question for that user-defined clip plane are all less than zero (i.e. are negative) (this is on the assumption that the convention being used is that any position behind a user-defined clip plane will have a negative distance to the user-defined clip plane) (step 404).

When it is determined that all the vertex clip distances for a primitive to the user-defined clip plane are less than zero (i.e. are negative) (thereby indicating that the primitive is entirely behind the clip plane in question (and so should be clipped (culled) on the basis of the user-defined clip plane)), the primitive is then culled at the primitive setup stage and no further processing is performed in respect of the primitive (step 405).

On the other hand, when at least one of the vertices for a primitive has a clip distance not less than zero to the user-defined clip plane in question, then it is considered whether the clip distances to the user-defined clip plane for all the vertices for the primitive are greater than or equal to zero (step 406). This effectively determines whether the primitive lies entirely on the "visible" side (in front of) the user-defined clip plane in question.

In the case where the clip distances for all the vertices of the primitive are greater than or equal to zero, then it can be determined that the entire primitive is in front of the user-defined clip plane in question (and that the user-defined clip plane in question does not intersect the primitive), such that no clipping will be required in respect of the user-defined clip plane in question, and therefore no edge needs to be determined for the user-defined clip plane in question (step 407).

On the other hand, in the case where the clip distances for a vertex of the primitive are not all negative and are not all greater than or equal to zero, then that will mean, and it can be determined that, the clip plane intersects the primitive. In this case, the primitive will require clipping against the clip plane (step 408), and so an edge equation for the edge representing the intersection of the clip plane with the primitive is determined by the primitive set-up unit 81 (step 409).

The primitive setup unit 81 will determine the edge equation (line equation) for an edge representing the intersection of a clip plane with a primitive in a similar manner to the way that it determines the appropriate edge equations (line equations) for the actual edges of a primitive. Thus it will use the distances from the vertex for the primitive to the clip plane to derive an appropriate line equation (and in particular the line equation coefficients) for an edge representing the intersection of the clip plane with the primitive. An embodiment of the determination of an edge that represents the intersection of a clip plane with a primitive will be described in more detail below.

The primitive setup unit 81 may be provided with additional arithmetic units (arithmetic circuits) for performing the processing required to determine edges representing the intersections of user-defined clip planes with primitives if desired, or it could be configured as if only to determine the actual edges of the primitive, with each primitive then being subjected, where required, to additional processing cycles in the primitive setup unit 81 where user-defined clip plane edges need to be determined in addition to the actual edges of a primitive.

Other arrangements would, of course, be possible.

Correspondingly, the (local) storage that is provided for the primitive setup unit 81 to store appropriate vertex data when determining edges for a primitive (and the corresponding output edge equation information, e.g. line equation coefficients) may, if desired, be increased (additional storage provided) compared to if no user-defined clip plane edges were being derived, to allow for the possible need to determine and then store user-defined clip plane edges for primitives, if desired.

Figure 6:
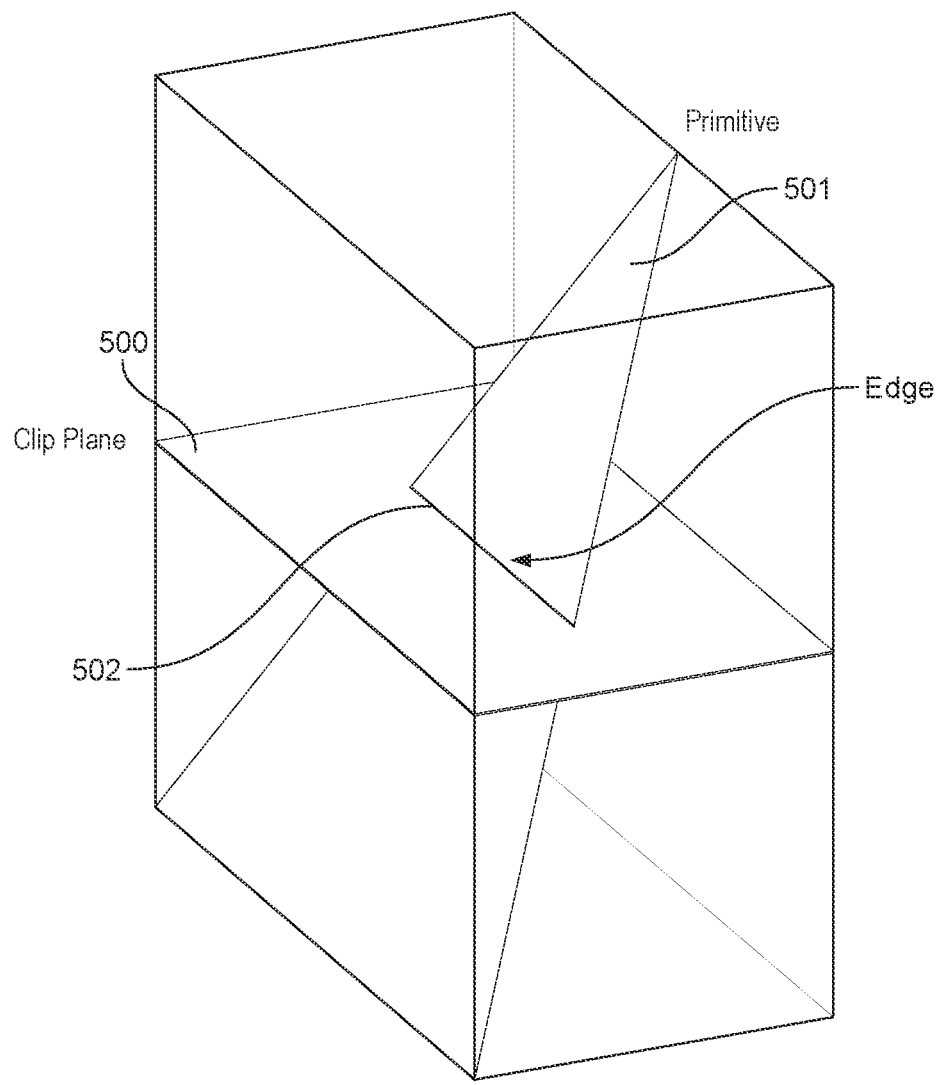
FIG. 6 illustrates the handling of a user-defined clip plane in an embodiment of the technology described herein.

FIG. 6 illustrates the situation where a user-defined clip plane 500 intersects an exemplary primitive 501 and shows the corresponding edge 502 that is determined as the intersection of the clip plane with the primitive 501.

This process is repeated for all of the user-defined clip planes for the render output in question (step 410).

Once all the user-defined clip planes have been considered in this manner (and the primitive hasn't otherwise been culled on the basis of a user-defined clip plane), then the primitive is sent onwards to the rasterisation stage 82 for rasterisation (step 411).

It will be appreciated that at this point the primitive will have associated with it a set of edges (edge equations) representing the actual edges of the primitive, together with, potentially, one or more edges (edge equations) representing intersections of the primitive with respective user-defined clip planes.

Each edge will be represented as a respective line equation, and defined in terms of the appropriate coefficients (constants) for the line equation representing the edge.

The edges associated with the primitive (their line equation coefficients) will then be provided to the rasteriser (e.g. by being stored in appropriate local storage of the rasteriser) for use when rasterising the primitive. (The appropriate edge information will be provided as part of the primitive data (state) provided to the rasteriser for a primitive for use when rasterising the primitive.)

(Any local storage provided for storing edge information for use by the rasteriser may, if desired, be appropriately increased to allow for the need to store additional, user-defined clip plane edges, for primitives.)

When rasterising the primitive, the rasteriser 82 will then test the edges associated with the primitive (being both the actual primitive edges and any user-defined clip plane edges) to determine whether and how to rasterise the primitive to fragments for rendering.

When rasterising a primitive in the present embodiments, the rasteriser 82 will operate to test respective regions of a render output being generated against the edges associates with a primitive being rasterised (including, as appropriate, both the actual primitive edges and any user-defined clip plane edges) to thereby generate graphics fragments representing the primitive for processing to render the primitive.

In the present embodiments, the rasteriser operates in a hierarchical manner, by testing progressively smaller regions of the render output against edges for a primitive to identify those regions of the render output that need to be rendered for the primitive.

Thus, in the present embodiments, the rasteriser operates to iteratively test primitives against progressively smaller regions (patches) of the render output (target) area (and thus, correspondingly, patches of fragments), down to a minimum region (patch) size corresponding, in the present embodiments, to a 2×2 group of fragments (i.e. to an array of sampling points that would be rasterised to a 2×2 group of fragments), discarding any regions (patches) that are not (at least in part) covered by the primitive (and not otherwise culled on the basis of a user-defined clip plane edge). Each region (patch) that is tested corresponds to a given set of fragments.

The rasterisation stage 82 of the rasteriser 206 performs this render output region (patch) testing. To do this, it starts with a large region (patch) of the render output (the render target) area and tests the region (patch) against the edges for the primitive in question to determine if the region (patch) can be completely culled on the basis of a user-defined clip plane edge, and, if not, if the primitive at least partially covers any region (patch) of a 2×2 set of smaller regions (patches) of the render output (the render target area) that the large region (patch) is divided into (encompasses) (based on the actual edges of the primitive).

As discussed above, the user-defined clip plane and actual edges for a primitive are represented by appropriate line (edge) equations that have been derived from the clip distances and/or vertices of the primitive. A grid of sampling positions is derived for the region (patch) (and for each region (patch)) being tested and the region (patch) sampling positions are then used with the line equations representing the edges for the primitive in question to perform an edge test for the edges to determine if the region (patch) should be culled for a user-defined clip plane and, if not, is at least partially covered by the primitive.

The rasteriser can perform the edge test to determine if a given region (patch) being tested is entirely outside a user-defined clip plane edge and/or is at least partially covered by a primitive, based on the user-defined clip plane and actual edges for the primitive in any suitable and desired manner. This is in an embodiment done in the normal manner for the graphics processor and graphics processing pipeline in question (i.e. using the existing rasterisation edge testing arrangements for the graphics processor and graphics processing pipeline in question).

When it is found that a larger region (patch) is entirely outside a user-defined clip plane edge, or is not covered by the primitive at all, then the region (patch) is not processed further in respect of the primitive in question (i.e. the entire region (patch) is discarded for the primitive in question), and another (the next) large region (patch) is tested against the edges for the primitive, and so on.

On the other hand, when it is not (it is other than) determined that a larger region (patch) is entirely outside any of the user-defined clip plane edges for a primitive (i.e. such that the larger region (patch) cannot be discarded on the basis of the user-defined clip plane edges), and the primitive is found to at least partially cover at least one of the smaller regions (patches) of the set of plural smaller regions (patches) of the render output that the large region (patch) encompasses (is divided into) (i.e. the primitive is found to cover, at least in part, the large patch), the large region (patch) is subdivided into its tour smaller regions (patches), and each covered such smaller region (patch) ("sub-patch") is then tested against the primitive and processed in the same way (i.e. discarded, or sub-divided into a set of smaller regions (patches), depending upon whether it is entirely outside a user-defined clip plane edge or not, and covered by the primitive or not).

This region (patch) testing and discarding or subdivision is continued until the minimum region (patch) size is reached.

The present embodiment supports four levels of subdivision (three sub-division iterations) and so starts with large regions (patches) corresponding to 16×16 fragments, which are then (if appropriate) subdivided into four 8×8 fragment regions (patches). Each of those 8×8 fragment regions (patches) is then subdivided into respective 4×4 fragment regions (patches) (if appropriate). Finally, each 4×4 fragment region (patch) is subdivided into respective 2×2 fragment regions (patches) (if appropriate). As in the present embodiment a 2×2 fragment region (patch) is the minimum region (patch) size that is used, the (potential) subdivision process stops at this point. Other arrangements would, of course, be possible.

Figure 7:
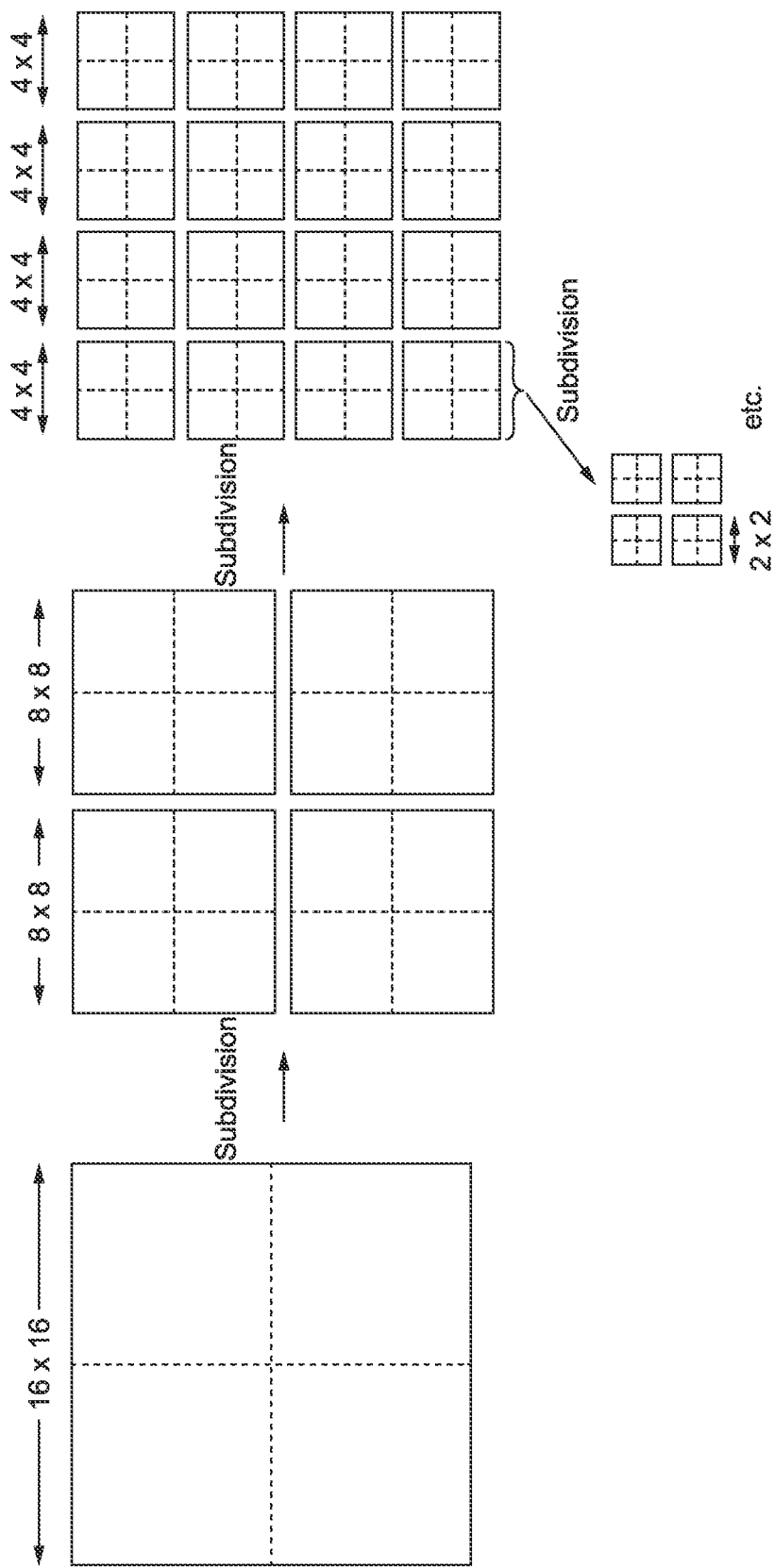
FIG. 7 illustrates schematically aspects of the rasterisation process in an embodiment of the technology described herein.

FIG. 7 illustrates the subdivision process and shows a top level, 16×16 fragment, region (patch) being progressively subdivided down to the minimum region (patch) size of 2×2 fragments.

Once the minimum region (patch) size has been reached (i.e. a region (patch) of 2×2 fragments that the primitive covers, at least in part, has been identified), the rasterisation stage 82 then tests the individual sampling positions in that final region (patch) to see if the sampling positions are outside any user-defined clip plane edge, and, if not, are covered by the primitive. The rasteriser 206 then generates and outputs individual fragments for rendering corresponding to the (not culled) sampling positions found to be covered by the primitive (so four fragments if all the 2×2 fragments in the minimum size region (patch) are at least partially covered by the primitive (and not culled on the basis of a user-defined clip plane edge).

In the present embodiments, each graphics fragment that is generated by the rasteriser represents (has associated with it) plural (and normally four) sampling positions. (Other arrangements would, of course, be possible).

The rasteriser 206 also associates with each fragment a coverage mask in the form of a bitmap that indicates, for each sample position of the set of sample positions that is associated with the fragment, whether that sample position is covered by the primitive (i.e., in effect, whether the fragment is being used to render that sampling position (i.e. whether its data should be stored for that sampling position)).

In the present embodiment, the rasterisation process takes each largest-size region (patch) to be tested against a primitive in turn, and sub-divides that region (patch) and then tests the relevant smaller regions (patches) (sub-patches) within that largest-size region (patch), and so on, until all sub-division and testing for that largest-size region (patch) has been completed.

Once this is done, the rasterisation process then moves on to the next first level, largest size region (patch), and tests that region (patch), and so on, until all the first level, largest size regions (patches) that the primitive is to be tested against have been tested.

Other arrangements would, of course, be possible.

Figure 8:
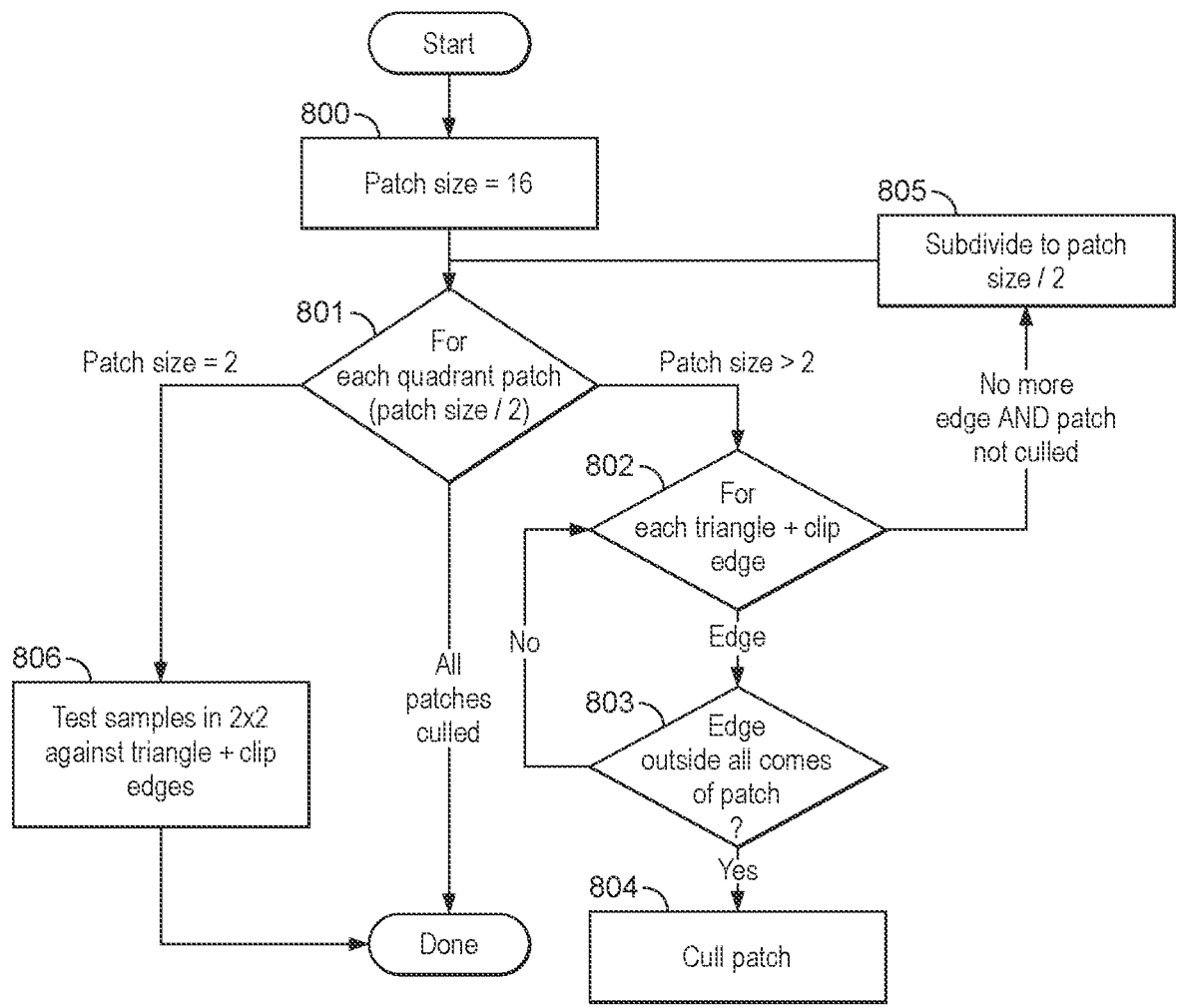
FIG. 8 is a flow chart showing aspects of the rasterisation process in an embodiment of the technology described herein.

FIG. 8 shows more details of the rasterisation process in the present embodiments (of step 411 of FIG. 5).

FIG. 8 shows the rasterisation operation in respect of a single largest sized patch of the rasterisation hierarchy for a given primitive. This will be repeated for each largest sized patch that is to be considered for the primitive in question (and correspondingly for each primitive that is to be rasterised).

As shown in FIG. 8, the rasterisation process starts with the largest patch size, which in the present embodiments is 16×16 sampling positions (step 800).

Then, for each of the smaller quadrant patches making up the larger size patch (so for each of the 8×8 patches making up the 16×16 patch when starting at the largest supported patch size), it is determined whether the patch size is greater than 2×2 or not (step 801).

Where the "quadrant" patch size is greater than 2×2, then each of the four patches making up the larger patch is tested against the user-defined clip plane edges and the actual edges of the primitive in turn (steps 802 and 803). For each edge being tested, it is determined whether the edge is outside all of the corners of the patch (step 803), and if so, the patch is culled (in respect of the primitive being rasterised) (step 804).

As shown in FIG. 8, if the patch is not culled on the basis of an edge associated with the primitive, then a next edge associated with the primitive is considered, and so on, until either the patch is culled on the basis of an edge associated with the primitive, or all the edges have been tested and the patch has not been culled.

In the case where all the edges have been tested and a patch is not culled, then the patch is subdivided to the next smaller subdivision (step 805), and then the process repeated for that smaller patch size.

This is continued, as shown in FIG. 8, until a patch size of 2×2 is reached (and the patch has not otherwise been culled), at which point the individual sampling positions in the 2×2 patch are tested against the triangle and clip plane edges (step 806) to determine which sampling positions of the 2×2 patch should be rendered for the primitive. The rasteriser will then generate an appropriate fragment for rendering the appropriate sampling positions of the 2×2 patch that pass all of the edge tests.

This process is repeated for all the patches to be considered for the primitive, until the primitive has been completely rasterised to determine the fragments, if any, that should be rendered for the primitive.

It will be appreciated that as part of this processing, the rasteriser may need to take account of more edges (namely any user-defined clip plane edges) than the actual edges of a primitive. However, while this may require more edge testing in the rasteriser (and thus more rasterisation cycles for a primitive), the rasteriser can otherwise perform the edge tests for these additional edges in the same way as it operates for the actual edges of a primitive. Thus although more processing may be required in the rasteriser, the rasteriser does not otherwise require any significant modification from its "normal" operation (and can, in particular, handle any edges defining the intersection of a primitive with a user-defined clip plane in the same manner as it would for an "actual" edge for a primitive). The rasteriser may require additional local storage to store the necessary data and parameters (e.g. coefficients), etc., for processing any additional user-defined clip plane edges to be considered, but that can straightforwardly be provided to the rasteriser, if required.

In the present embodiments, each primitive to be rasterised is tested against each first level (larger size) region (patch) of the render output that falls within (is covered by) a bounding box generated for the primitive. Other arrangements would, of course, be possible.

Once all the required highest level, largest size regions (patches) of the render output have been tested against a primitive, then the rasterisation process moves on to the next primitive for the render output being generated and so on, until all the primitives for the render output in question have been rasterised.

The process then moves on to the next render output (e.g. tile) to be generated once all the primitives for the render output in question have been rasterised, and so on.

The rasteriser may be configured as a pipeline that can contain and process plural regions (patches) at the same time. The rasteriser may also be configured to be able to generate plural fragments at a time (simultaneously) (e.g where a primitive is found to completely cover a region (patch) of the render output that encompasses plural fragments (e.g. plural sampling positions or sets of sampling positions)).

Other arrangements would, of course, be possible.

The fragments (if any) issued by the rasteriser 206 for a primitive are then subjected to the appropriate fragment processing, as discussed above with reference to FIG. 3.

As shown in FIG. 3, the first part of this processing is to subject each fragment issued (output) by the rasteriser 206 to an early depth and stencil test in the early depth and stencil test stage 207.

Fragments that pass the early depth and stencil test 207 (i.e. fragments having at least one associated covered sampling position that passes the early depth and stencil test 207) are then sent onwards to the fragment shader 208 (the renderer), as shown in FIG. 3.

The fragment shader 208 performs the appropriate fragment processing (rendering) operations on the fragments it receives, so as to process the fragments to generate the appropriate fragment data, etc., for the render output (e.g. for display of the fragments).

There is then a "late" fragment Z and stencil test 209, which (if it is to be performed, e.g. where a fragment did not undergo the early Z and stencil test) carries out, inter alia, an end of pipeline depth test on the shaded fragments (on the covered sampling points associated with shaded fragments) to determine whether the sampling points that a rendered fragment represents will overdraw the fragments whose values are currently stored in the tile buffer 211 (i.e. determines whether the fragment data for the fragments issuing from the fragment shader 208 should be stored in the tile buffers 211 (should replace or modify the fragment data in the tile buffer(s) of the fragments that have already been rendered)).

The fragments that pass the late fragment test 209 are then subjected to any remaining operations necessary on the fragments, such as blending with the framebuffer, dither etc. (not shown).

Finally, the output fragment data values are written to appropriate tile buffers 211.

Once each tile has been processed, its data is, e.g., exported from the tile buffers 211 to a main memory (e.g. to a frame buffer 213 in a main memory) for storage, and the next tile is then processed, and so on, until sufficient tiles have been processed to generate the entire render output (e.g. frame (image) to be displayed).

Other arrangements for the fragment processing would, of course, be possible.

The way that an edge representing the intersection of a user defined clip plane is determined in the present embodiments will now be described.

Consider 3 points R, S, T in the perspective projected clip plane. Each point in this plane is defined as $\vec{R} = x_R \vec{i} + y_R \vec{j} + \delta_R \vec{k}$, where $$\delta_R = \frac{clipDistance}{w_R}$$

is the perspective projected clip distance at the vertex R. The plane equation for the clip plane is $$a_1 x + b_1 y + c_1 z + d_1 = 0$$

where $$a_1 = \begin{vmatrix} y_S - y_R & \delta_S - \delta_R \\ y_T - y_R & \delta_T - \delta_R \end{vmatrix}$$

-continued $$b_1 = \begin{vmatrix} \delta_S - \delta_R & x_S - x_R \\ \delta_T - \delta_R & x_T - x_R \end{vmatrix}$$

$$c_1 = \begin{vmatrix} x_S - x_R & y_S - y_R \\ x_T - x_R & y_T - y_R \end{vmatrix}$$

$$d_1 = -(a_1 x_R + b_1 y_R + c_1 \delta_R)$$

The clip edge is the intersection between the perspective projected clip plane and the plane at $\delta=0$.

Vector normals of the 2 planes are $$\vec{n_1} = a_1 \vec{i} + b_1 \vec{j} + c_1 \vec{k}$$

$$\vec{n_2} = a_2 \vec{i} + b_2 \vec{j} + c_2 \vec{k}$$

where the intersection of the clip plane at zero clip distance implies $a_2=0$, $b_2=0$, $c_2=1$, $d_2=0$.

The plane intersection is determined by $\vec{n_3} = \vec{n_1} \times \vec{n_2}$ and $\vec{p} = \vec{p_0} + t\vec{n_3}$ where $\vec{p}$ is the intersection line and t is an arbitrary scalar.

The normal vector is $$\vec{n_3} = \begin{vmatrix} \vec{i} & \vec{j} & \vec{k} \\ a_1 & b_1 & c_1 \\ a_2 & b_2 & c_2 \end{vmatrix} = \begin{vmatrix} \vec{i} & \vec{j} & \vec{k} \\ a_1 & b_1 & c_1 \\ 0 & 0 & 1 \end{vmatrix} = b_1 \vec{i} - a_1 \vec{j} => \begin{cases} a_3 = b_1 \\ b_3 = -a_1 \\ c_3 = 0 \end{cases}$$

The base point vector is determined by $$\vec{p_0} = x_0 \vec{i} + y_0 \vec{j} + z_0 \vec{k}$$

Where $$x_0 = \frac{1}{DET}\left(d_2 \begin{vmatrix} b_1 & c_1 \\ b_3 & c_3 \end{vmatrix} - d_1 \begin{vmatrix} b_2 & c_2 \\ b_3 & c_3 \end{vmatrix}\right) = -\frac{1}{DET} d_1 a_1$$

$$y_0 = \frac{1}{DET}\left(d_2 \begin{vmatrix} a_3 & c_3 \\ a_1 & c_1 \end{vmatrix} - d_1 \begin{vmatrix} a_3 & c_3 \\ a_2 & c_2 \end{vmatrix}\right) = -\frac{1}{DET} d_1 b_1$$

$$z_0 = \frac{1}{DET}\left(d_2 \begin{vmatrix} a_1 & b_1 \\ a_3 & b_3 \end{vmatrix} - d_1 \begin{vmatrix} a_2 & b_2 \\ a_3 & b_3 \end{vmatrix}\right) = 0$$

$$DET = \begin{vmatrix} a_1 & b_1 & c_1 \\ a_2 & b_2 & c_2 \\ a_3 & b_3 & c_3 \end{vmatrix} = \begin{vmatrix} a_1 & b_1 & c_1 \\ 0 & 0 & 1 \\ a_3 & b_3 & c_3 \end{vmatrix} = b_1 a_3 - a_1 b_3 = a_1^2 + b_1^2$$

The intersection line is thus $$\vec{p} = \vec{p_0} + t\vec{n_3} = x_0 \vec{i} + y_0 \vec{j} + t(b_1 \vec{i} - a_1 \vec{j})$$

for a free scalar t.

The general line equation through two points $(x_0, y_0)$ and $(x_1, y_1)$ is $$\frac{y - y_0}{x - x_0} = \frac{y_1 - y_0}{x_1 - x_0} = \frac{\Delta y}{\Delta x}$$

Which is equivalent to $$x\Delta y - y\Delta x - x_1 \Delta y + y_1 \Delta x = 0$$

Inserting the 2 points t=0 and t=1 gives $$-xa_1 - yb_1 + x_0 a_1 + y_0 b_1 = 0$$

Which is $$-xa_1 - yb_1 - \frac{d_1}{DET}(b_1^2 + a_1^2) = 0$$

This simplifies to $$a_1 x + b_1 y + d_1 = 0$$

In the present embodiments, the primitive setup unit implements versions of these edge equations corresponding (e.g. in terms of precision) to the edge equations used for the actual edges of primitives, and thus, e.g., implements fixed point versions of these edge equations, e.g. with the coefficients $a_1$ and $b_1$ in 15:8 signed fixed point and $d_1$ in 20:12 signed fixed point.

(The x and y differences are already known from the standard edge calculations, combined with clip distance differences, the coefficients of the clip distance edges can be obtained.)

Edge equations for clipping lines can be determined from the point where a line intersects with a plane and the edge being orthogonal to the line projected onto the plane.

Consider the plane equation $$ax + by + c\delta + d = 0$$

with normal vector $$\vec{n} = a\vec{i} + b\vec{j} + c\vec{k}$$

A point in the plane is described as $$\vec{p} = x\vec{i} + y\vec{j} + \delta\vec{k}$$

With the condition $$\vec{p} \cdot \vec{n} + d = 0$$

The line equation is $$\vec{p} = \vec{p_0} + \lambda \vec{p_v}, \forall \lambda \in \mathbb{R}$$

Where the point and vector are described by, the 2 points $\vec{p_l} = x_l \vec{i} + y_l \vec{j} + \delta_l \vec{k}$, $\delta_l \vec{k}$, $\forall l \in [0,1]$ and $$\vec{p_v} = (x_1 - x_0)\vec{i} + (y_1 - y_0)\vec{j} + (\delta_1 \delta_0)\vec{k}$$

The intersection condition is $$\vec{n} \cdot (\vec{p_0} + \lambda \vec{p_v}) + d = 0$$

Rewriting gives $$\lambda = \frac{-(\vec{n} \cdot \vec{p_0} + d)}{\vec{n} \cdot \vec{p_v}}$$

The plane at $\delta=0$ gives $\vec{n} = \vec{k}$ and d=0. Inserting and simplifying gives $$\lambda = \frac{-\delta_0}{\delta_1 - \delta_0} = \frac{\delta_0}{\delta_0 - \delta_1}$$

The intersection point is $$\vec{p} = \vec{p_0} + \lambda \vec{p_v} =$$

-continued $$x_0\vec{i} + y_0\vec{j} + \delta_0\vec{k} + \frac{\delta_0}{\delta_0 - \delta_1}\left((x_1 - x_0)\vec{i} + (y_1 - y_0)\vec{j} + (\delta_1 - \delta_0)\vec{k}\right) ==$$

$$\vec{i}(x_0 + \lambda(x_1 - x_0)) + \vec{j}(y_0 + \lambda(y_1 - y_0)) = u\vec{i} + v\vec{j}$$

Where u and v are defined as $$u = x_0 + \lambda(x_1 - x_0)$$

$$v = y_0 + \lambda(y_1 - y_0)$$

Projecting the line onto the δ=0 plane gives $$\vec{p}_{proj} = (u + t(x_1 - x_0))\vec{i} + (v + t(y_1 - y_0))\vec{j}, \forall t \in \mathbb{R}$$

We would like to have a line which is orthogonal to this one $$\vec{p}_{proj} \cdot \vec{q} = (u + t(x_1 - x_0))q_x + (v + t(y_1 - y_0))q_y = 0$$

There is a pair of solutions $$\begin{cases} q_x = \pm(v + t(y_1 - y_0)) \\ q_y = \mp(u + t(x_1 - x_0)) \end{cases}$$

Where the sign is selected depending on which direction the line crosses the plane.

The edge equation for this line is $$\frac{y - v}{x - u} = \frac{\Delta y}{\Delta x} \Rightarrow -x\Delta y + y\Delta x + u\Delta y - v\Delta x = 0$$

Using the 2 points t=0 and t=1 and the positive branch gives $$\Delta x = y_1 - y_0$$

$$\Delta y = x_0 - x_1$$

Inserting in the edge equation finally gives $$(x_1 - x_0)x + (y_1 - y_0)y + u(x_0 - x_1) + v(y_0 - y_1) = 0$$

(The negative branch negates the entire edge.)

It can be seen from the above that the technology described herein, in its embodiments at least, provides beneficial mechanisms for taking account of user-defined clip planes when generating a render output in graphics processing. This is achieved, in the embodiments of the technology described herein at least, by generating edges representing the intersections of user-defined clip planes with primitives, and then testing those edges as part of the rasterisation process when rasterising the primitives.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processor that includes a rasteriser that is operable to test a region of a render output being generated against edges defined for a primitive to be rendered to determine whether the primitive covers any part of the region of the render output, the method comprising:
   when generating a render output in which primitives to be rendered are to be clipped against a user-defined clip plane defined for the render output, such that when at least part of a primitive to be rendered falls behind the user-defined clip plane, the at least part of the primitive to be rendered that falls behind the user-defined clip plane should be clipped to the user-defined clip plane;
   for a primitive to be rendered for the render output that is intersected by the user-defined clip plane defined for the render output:
      determining an edge representing the intersection of the primitive with the user-defined clip plane; and
      the rasteriser, when rasterising the primitive:
         testing one or more regions of the render output being generated against the determined edge representing the intersection of the primitive with the user-defined clip plane to determine whether the region or regions should not be rendered for the primitive on the basis of the user-defined clip plane.

2. The method of claim 1, wherein the primitive comprises one or more vertices, and each vertex of the primitive has associated with it, a distance from the vertex to the user-defined clip plane; and
   the method comprises:
      determining the edge representing the intersection of the primitive with the user-defined clip plane using the distances to the user-defined clip plane associated with the vertices of the primitive.

3. The method of claim 1, wherein the edge representing the intersection of the primitive with the user-defined clip plane is determined by a primitive setup process that also determines the edges of the primitive.

4. The method of claim 1, wherein the method comprises:
   for a primitive to be rendered for the render output:
      determining for a user-defined clip plane defined for the render output, whether the primitive to be rendered is intersected by the user-defined clip plane defined for the render output; and
      when it is determined that the primitive is intersected by the user-defined clip plane:
         determining an edge representing the intersection of the primitive with the user-defined clip plane.

5. The method of claim 4, wherein the primitive comprises one or more vertices, and each vertex of the primitive has associated with it, a distance from the vertex to the user-defined clip plane; and
   the method comprises:
      determining whether the primitive is intersected by the user-defined clip plane based on the signs of the distances to the user-defined clip plane associated with the vertices of the primitive.

6. The method of claim 4, comprising:
   when the primitive is not intersected by the user-defined clip plane:
      determining whether to cull the primitive from further processing on the basis of the user-defined clip plane.

7. The method of claim 6, comprising:
   when it is determined to cull the primitive from further processing on the basis of the user-defined clip plane, omitting further processing for the primitive in respect of another user-defined clip plane.

8. The method of claim 6, comprising:
after all the user-defined clip planes for the render output have been considered for the primitive, and the primitive has not been culled from further processing on the basis of a user-defined clip plane:
determining edges representing the edges of the primitive to be rendered.

9. The method of claim 1, comprising the rasteriser, when testing a region of the render output against a determined edge representing the intersection of a primitive with a user-defined clip plane:
determining whether the region of the render output is entirely outside the edge representing the intersection of the primitive with the user-defined clip plane; and
when it is determined that the region of the render output is entirely outside the edge representing the intersection of the primitive with the user-defined clip plane:
determining that the region should not be rendered for the primitive on the basis of the user-defined clip plane.

10. The method of claim 9, comprising:
when it is determined that the region of the render output should not be rendered for the primitive on the basis of the user-defined clip plane, omitting further processing for the region in respect of another edge for the primitive.

11. A graphics processor, the graphics processor comprising:
a rasteriser that is operable to test regions of a render output being generated against edges defined for a primitive to be rendered to determine whether the primitive covers any part of the regions of the render output; and
a processing circuit configured to, when the graphics processor is generating a render output in which primitives to be rendered are to be clipped against a user-defined clip plane defined for the render output, such that when at least part of a primitive to be rendered falls behind a user-defined clip plane, the at least part of the primitive to be rendered that falls behind the user-defined clip plane should be clipped to the user-defined clip plane:
determine for a primitive to be rendered for a render output that is intersected by a user-defined clip plane defined for the render output, an edge representing the intersection of the primitive with the user-defined clip plane;
wherein the rasteriser is configured to, when rasterising a primitive for which an edge representing the intersection of the primitive with a user-defined clip plane has been determined:
test one or more regions of a render output being generated against the determined edge representing the intersection of the primitive with a user-defined clip plane to determine whether the region or regions should not be rendered for the primitive on the basis of the user-defined clip plane.

12. The graphics processor of claim 11, wherein the processing circuit is configured to:
determine an edge representing the intersection of a primitive with a user-defined clip plane using distances to the user-defined clip plane associated with the vertices of the primitive.

13. The graphics processor of claim 11, wherein the processing circuit comprises a primitive setup circuit before the rasteriser that also operates to determine information representing the positions of the edges of primitives to be rendered.

14. The graphics processor of claim 11, wherein the processing circuit is configured to:
for a primitive to be rendered for the render output:
determine for a user-defined clip plane defined for a render output, whether the primitive to be rendered is intersected by the user-defined clip plane defined for the render output; and
when it is determined that the primitive is intersected by the user-defined clip plane:
determine an edge representing the intersection of the primitive with the user-defined clip plane.

15. The graphics processor of claim 14, wherein the processing circuit is configured to:
determine whether a primitive is intersected by a user-defined clip plane based on the signs of distances to the user-defined clip plane associated with vertices of the primitive.

16. The graphics processor of claim 14, wherein the processing circuit is configured to:
when a primitive is not intersected by a user-defined clip plane:
determine whether to cull the primitive from further processing on the basis of the user-defined clip plane.

17. The graphics processor of claim 11, wherein the rasteriser is configured to, when testing a region of a render output against a determined edge representing the intersection of a primitive with a user-defined clip plane:
determine whether the region of the render output is entirely outside the edge representing the intersection of the primitive with the user-defined clip plane; and
when it is determined that the region of the render output is entirely outside the edge representing the intersection of the primitive with the user-defined clip plane:
determine that the region should not be rendered for the primitive on the basis of the user-defined clip plane.

18. The graphics processor of claim 17, wherein the rasteriser is configured to:
when it is determined that a region of a render output should not be rendered for a primitive on the basis of a user-defined clip plane, omit further processing for the region in respect of another edge for the primitive.

19. The graphics processor of claim 11, wherein the graphics processor is a tiled-based graphics processor.

20. A non-transitory computer readable storage medium storing computer software code which when executed on one or more processors performs a method of operating a graphics processor that includes a rasteriser that is operable to test a region of a render output being generated against edges defined for a primitive to be rendered to determine whether the primitive covers any part of the region of the render output, the method comprising:
when generating a render output in which primitives to be rendered are to be clipped against a user-defined clip plane defined for the render output, such that when at least part of a primitive to be rendered falls behind the user-defined clip plane, the at least part of the primitive to be rendered that falls behind the user-defined clip plane should be clipped to the user-defined clip plane;
for a primitive to be rendered for the render output that is intersected by the user-defined clip plane defined for the render output:
determining an edge representing the intersection of the primitive with the user-defined clip plane; and
the rasteriser, when rasterising the primitive:
testing one or more regions of the render output being generated against the determined edge representing the intersection of the primitive with the user-defined clip plane to determine whether the region or regions should not be rendered for the primitive on the basis of the user-defined clip plane.

* * * * *